US009004696B1

(12) United States Patent
Mikawa et al.

(10) Patent No.: US 9,004,696 B1
(45) Date of Patent: *Apr. 14, 2015

(54) IMAGE PROJECTION APPARATUS

(71) Applicants:Akihisa Mikawa, Kanagawa (JP);
Tetsuya Fujioka, Kanagawa (JP); Hideo Kanai, Tokyo (JP); Masamichi Yamada, Kanagawa (JP); Yasunari Mikutsu, Tokyo (JP); Satoshi Tsuchiya, Kanagawa (JP); Naoyuki Ishikawa, Kanagawa (JP); Yukimi Nishi, Tokyo (JP)

(72) Inventors: Akihisa Mikawa, Kanagawa (JP);
Tetsuya Fujioka, Kanagawa (JP); Hideo Kanai, Tokyo (JP); Masamichi Yamada, Kanagawa (JP); Yasunari Mikutsu, Tokyo (JP); Satoshi Tsuchiya, Kanagawa (JP); Naoyuki Ishikawa, Kanagawa (JP); Yukimi Nishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/334,886

(22) Filed: Jul. 18, 2014

(30) Foreign Application Priority Data

Oct. 2, 2013 (JP) .................................. 2013-207712

(51) Int. Cl.
*G03B 21/18* (2006.01)
*G03B 21/16* (2006.01)

(52) U.S. Cl.
CPC ..................................... *G03B 21/16* (2013.01)

(58) Field of Classification Search
CPC . H04N 9/3105; H04N 9/3141; H04N 9/3144; H04N 9/3197
USPC .......... 353/52, 57, 58, 61, 119; 362/261, 264, 362/294, 373; 348/743–748
See application file for complete search history.

(56) References Cited

U.S. PATENT DOCUMENTS

| 6,402,324 | B1 * | 6/2002 | Kuroda et al. | 353/52 |
| 6,431,710 | B2 * | 8/2002 | Fuse et al. | 353/57 |
| 6,844,993 | B2 * | 1/2005 | Fujimori et al. | 359/820 |
| 8,334,783 | B2 * | 12/2012 | Katayama et al. | 340/635 |
| 2008/0174743 | A1 * | 7/2008 | Nakashita et al. | 353/57 |
| 2009/0268170 | A1 * | 10/2009 | Nakashita | 353/61 |
| 2013/0016290 | A1 * | 1/2013 | Takahashi | 348/836 |
| 2013/0128234 | A1 | 5/2013 | Fujioka et al. | |

FOREIGN PATENT DOCUMENTS

| JP | 2004-170541 A | 6/2004 |
| JP | 2009-251508 | 10/2009 |
| JP | 2013-109042 | 6/2013 |

OTHER PUBLICATIONS

Japanese Office Action mailed Jul. 11, 2014.

* cited by examiner

*Primary Examiner* — Sultan Chowdhury
(74) *Attorney, Agent, or Firm* — Harness, Dickey & Pierce, P.L.C.

(57) ABSTRACT

An image projection apparatus includes: a light source; an exhaust fan having a rotary shaft provided with at least one blade, the rotary shaft being rotated to exhaust air inside the apparatus to the outside of the apparatus; a guide having a sloped face that is sloped toward the exhaust fan, the sloped face having a first side surface facing the light source and a second side surface provided opposite of the first side surface; a first flow path, defined by the first side surface of the guide, to guide air heated by the light source toward the rotary shaft of the exhaust fan; and a second flow path, defined by the second side surface of the guide, to guide air having temperature lower than temperature of the air heated by the light source, toward the rotary shaft of the exhaust fan.

22 Claims, 24 Drawing Sheets

FIG. 2A
FIG. 2B
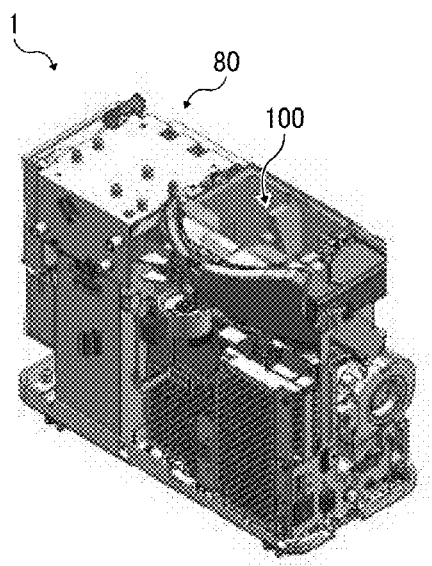
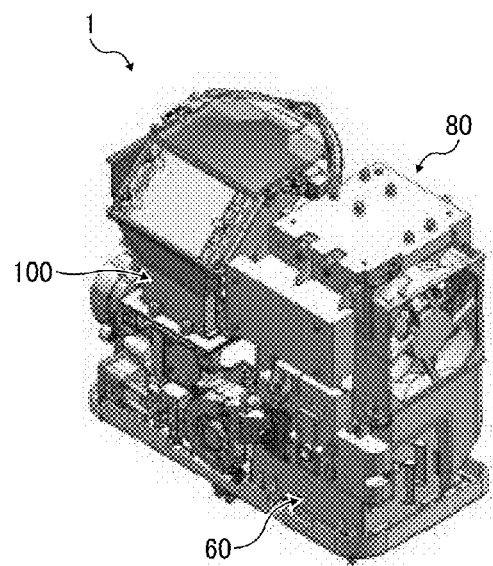

US 9,004,696 B1

IMAGE PROJECTION APPARATUS

CROSS-REFERENCE TO RELATED APPLICATIONS

This patent application is based on and claims priority pursuant to 35 U.S.C. §119(a) to Japanese Patent Application No. 2013-207712, filed on Oct. 2, 2013, in the Japan Patent Office, the entire disclosure of which is hereby incorporated by reference herein.

BACKGROUND

1. Technical Field

The present invention relates to an image projection apparatus such as a projector.

2. Description of the Related Art

The image projection apparatuses form an image based on image data received from a personal computer, a video camera or the like, using light emitted from a light source, and project the image on a screen or the like.

As the light source of the image projection apparatus, a halogen lamp, a metal halide lamp, a high-pressure mercury lamp and the like may be used. These lamps usually become a high temperature when emitting the light. To cool the light source, a blowing unit such as a blower or a fan may be provided to circulate air. Air that flows through the light source increases in temperature by drawing heat from the light source. Such air, which becomes a high temperature, is discharged from an exhaust duct.

SUMMARY

Example embodiments of the present invention include an image projection apparatus including: a light source; an exhaust fan having a rotary shaft provided with at least one blade, the rotary shaft being rotated to exhaust air inside the apparatus to the outside of the apparatus; a guide having a sloped face that is sloped toward the exhaust fan, the sloped face having a first side surface facing the light source and a second side surface provided opposite of the first side surface; a first flow path, defined by the first side surface of the guide, to guide air heated by the light source toward the rotary shaft of the exhaust fan; and a second flow path, defined by the second side surface of the guide, to guide air having temperature lower than temperature of the air heated by the light source, toward the rotary shaft of the exhaust fan.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 2A is a perspective view of the interior of the projector according to an embodiment of the present invention as viewed from the front side of FIG. 1;

FIG. 2B is a perspective view of the interior of the projector according to an embodiment of the present invention as viewed from the back side of FIG. 1;

The accompanying drawings are intended to depict example embodiments of the present invention and should not be interpreted to limit the scope thereof. The accompanying drawings are not to be considered as drawn to scale unless explicitly noted.

DETAILED DESCRIPTION

Hereinafter, an embodiment of the present invention will be described with reference to the drawings.

First, an overall configuration of the image projection apparatus, which may be provided with a light receiving device, will be described according to an embodiment of the present invention.

Figure 1:
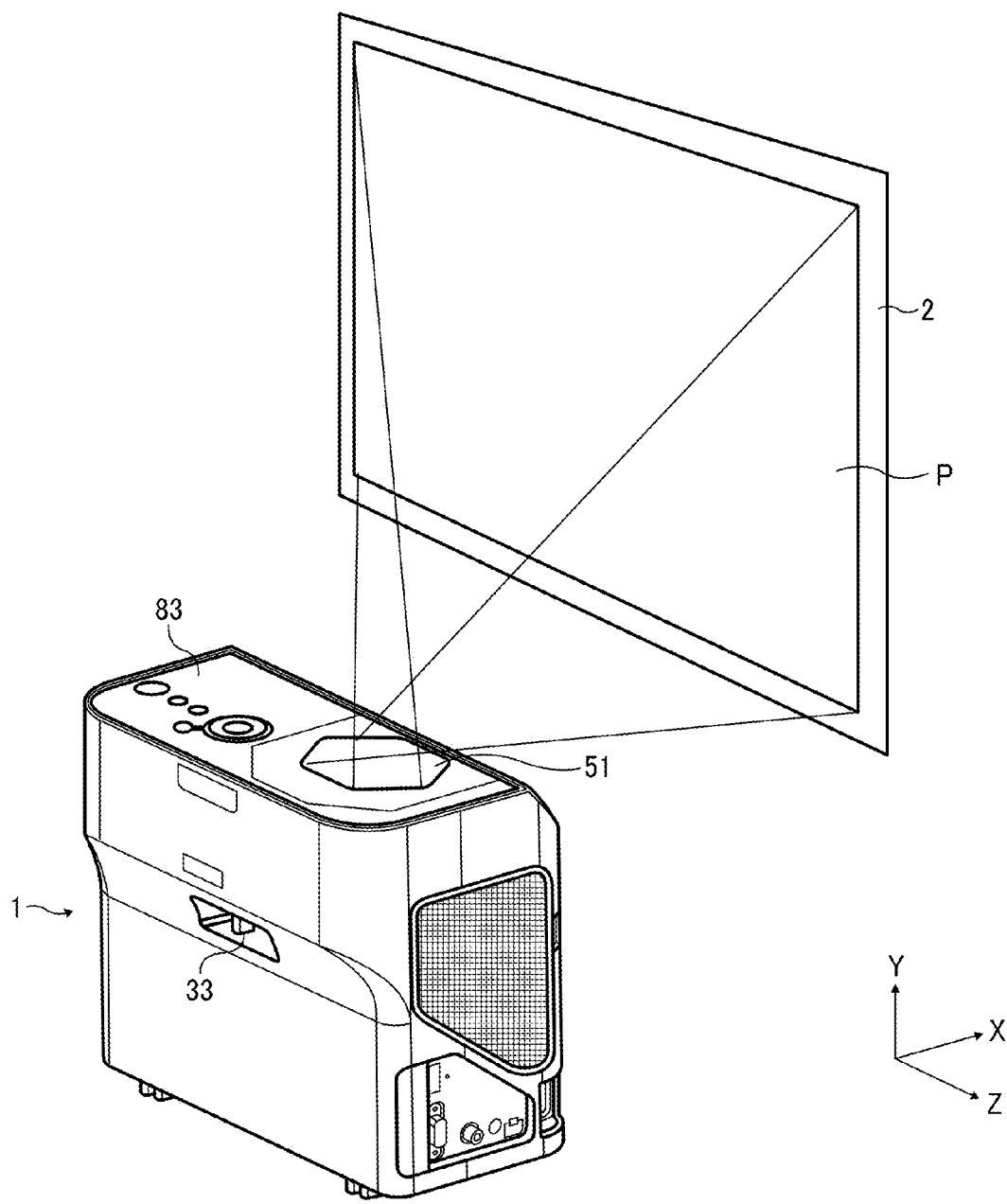
FIG. 1 is an external perspective view illustrating a projector and a projection plane according to an embodiment of the present invention.

FIG. 1 is an external perspective view illustrating a projector 1 as an image projection apparatus according to an embodiment of the present invention, and a projection plane 2 such as a screen. In the following description, as illustrated in FIG. 1, a normal direction of the projection plane 2 is defined as an X-direction, a direction (a vertical direction) of a minor axis of the projection plane is defined as a Y-direction, and a direction (a horizontal direction) of a major axis of the projection plane 2 is defined as a Z-direction.

The projector 1 is an apparatus that forms a projection image based on image data input from a personal computer, a video camera or the like, and projects the projection image P on the projection plane 2 such as a screen. In a liquid crystal projector, recently, an improvement in brightness, a cost reduction and the like accompanied by high resolution of the liquid crystal panel, and high efficiency of the light source (lamp) have been in progress. Furthermore, a small light projector using a digital micro-mirror device (DMD) as a micro drive mirror device is in widespread use, and the projector has come to be widely used even in homes as well as in offices and schools. Furthermore, a front-type projector has improved in portability and has come to be used even in small meeting of several people. In such a projector, there have been requests for enabling the projection of the image of a large screen (increase in screen size of the projection plane) and enabling the reduction of "projection space required other than the projector" as much as possible. As will be described below, the projector 1 of the present embodiment is configured so that a transparent optical system such as a projection lens is set in parallel to the projection plane 2, and after reflecting the optical flux at a reflective mirror, the optical flux expands and reflects with respect to the projection plane 2 by a free-form surface mirror. With this configuration, an upright optical engine can be downsized.

A dust-proof glass 51 is mounted on the upper surface of the projector 1. The optical flux passing through the dust-proof glass 51 is projected onto the projection plane 2 to form the projection image P on the projection plane 2. In addition, an operation unit 83 for allowing a user to operate the projector 1 is provided on the upper surface of the projector 1. Furthermore, a focus lever 33 for adjusting the focus is provided on the side surface of the projector 1.

Figure 3:
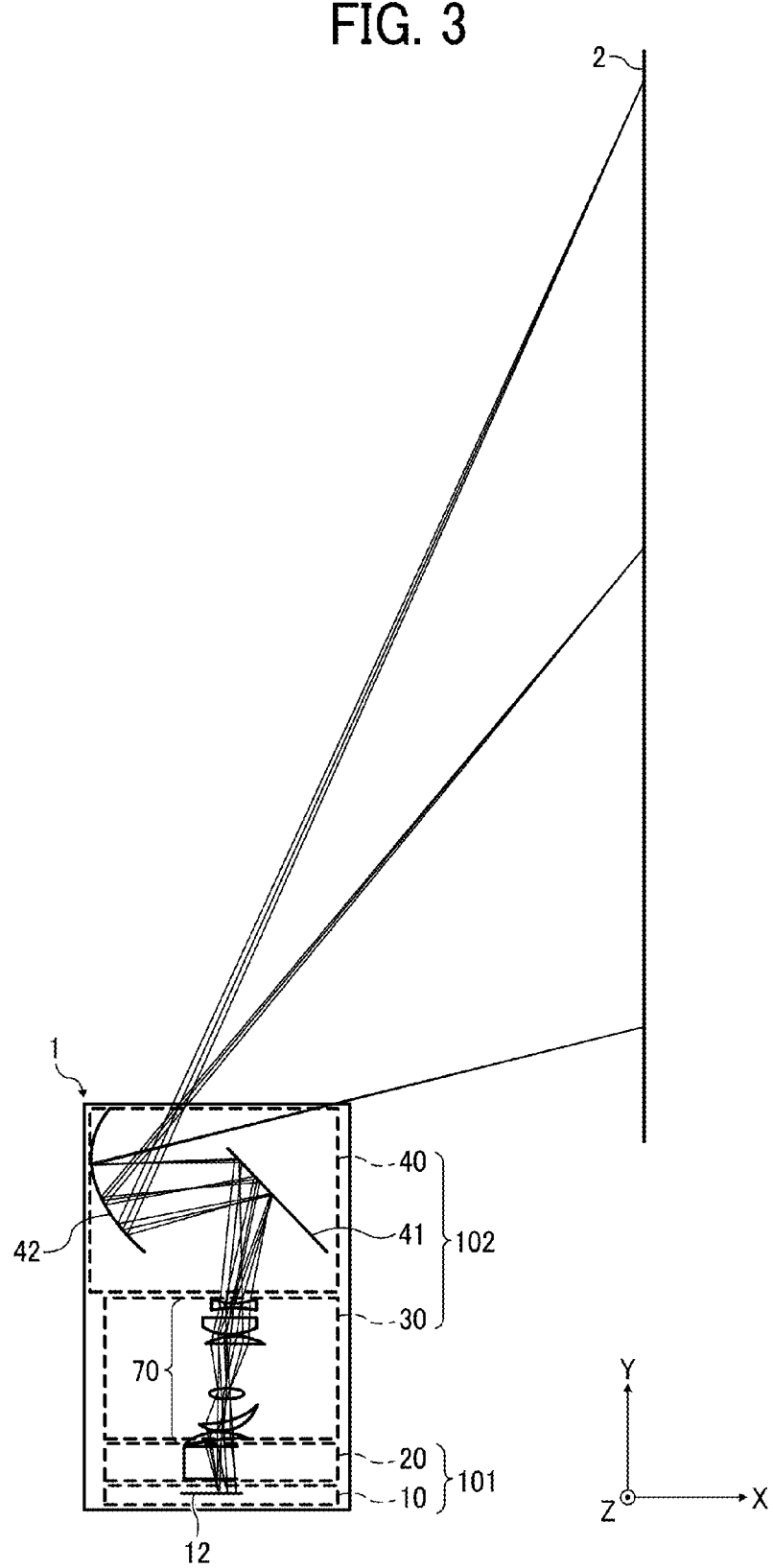
FIG. 3 is an explanatory diagram illustrating an optical path from the projector to a projection plane according to an embodiment of the present invention.

FIGS. 2A and 2B are a perspective view illustrating the interior of the projector 1 with a main body cover of the projector 1 removed. FIG. 2A is a perspective view of the interior of the projector 1 as viewed from the front side of FIG. 1, and FIG. 2B is a perspective view of the interior of the projector 1 as viewed from the back side of FIG. 1. Furthermore, FIG. 3 is a view of an optical path from the projector 1 to the projection plane 2.

The projector 1 is provided with an optical engine 100, and a light source unit 60 having a light source that emits white light. The optical engine 100 is provided with an image forming unit 101 that forms an image using the light from the light source, and a projection optical system 102 that projects the optical flux of the image formed by the image forming unit 101 onto the projection plane 2.

The image forming unit 101 (FIG. 3) includes a light modulator 10, and an illumination unit 20. The light modulator 10 has a DMD 12 serving as a micro drive mirror device that has a number of micro mirrors, which may be movable to vary the slope of the reflection surface. The illumination unit 20 reflects the light from the light source to the DMD 12 with light. The projection optical system 102 includes a first projection optical system 30, a curved mirror 42, and a second projection optical system 40. The first projection optical system 30 includes at least one refractive optical system of a transmission type and is provided with a coaxial optical system 70 having positive power. The second projection optical system 40 has a reflecting mirror 41, and a curved mirror 42 having the positive power.

Light from the light source is illuminated by the illumination unit 20, and by modulating the light illuminated by the illumination unit 20, an image is generated on the DMD 12. The light image generated by the DMD 12 is projected onto the projection plane 2 via the optical system 70 of the first projection optical system 30, the reflecting mirror 41 and the curved mirror 42 of the second projection optical system 40.

Figure 4:
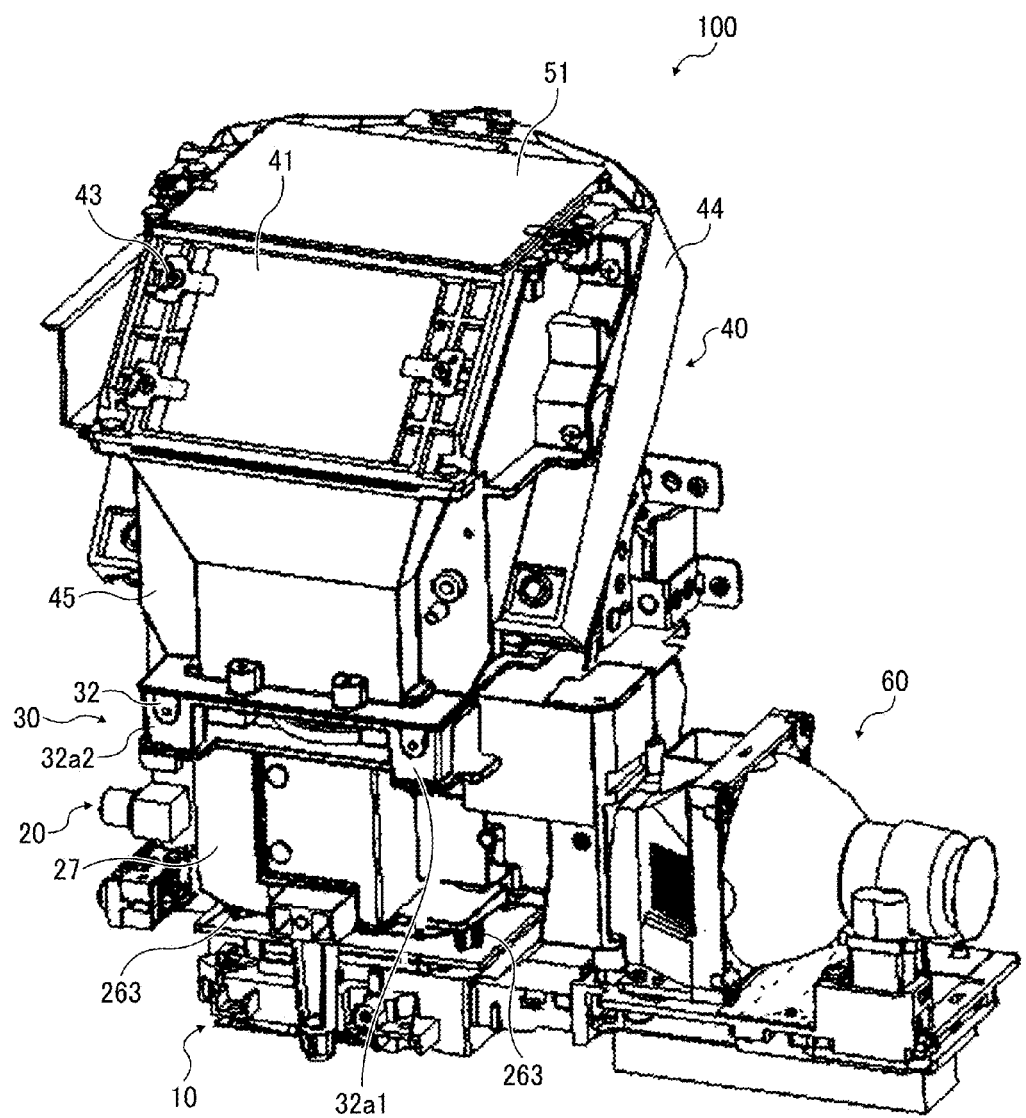
FIG. 4 is a perspective view of an optical engine and a light source provided inside the projector according to an embodiment of the present invention.

FIG. 4 is a perspective view of the optical engine 100 and the light source unit 60 provided inside the projector 1.

As illustrated in FIG. 4, the light modulator 10, the illumination unit 20, the first projection optical system 30, and the second projection optical system 40, collectively forming the optical engine 100 are arranged in parallel to the Y-direction of FIG. 4 of the direction parallel to the projection plane 2 and the image plane of the projection image P. Furthermore, the light source unit 60 is disposed on the right side of the illumination unit 20 in FIG. 4. Furthermore, reference numerals 32a1 and 32a2 illustrated in FIG. 4 indicate legs of a lens holder 32 of the first projection optical system 30, and reference numeral 263 indicates a screw unit for screwing the light modulator 10 into the illumination unit 20.

Figure 5:
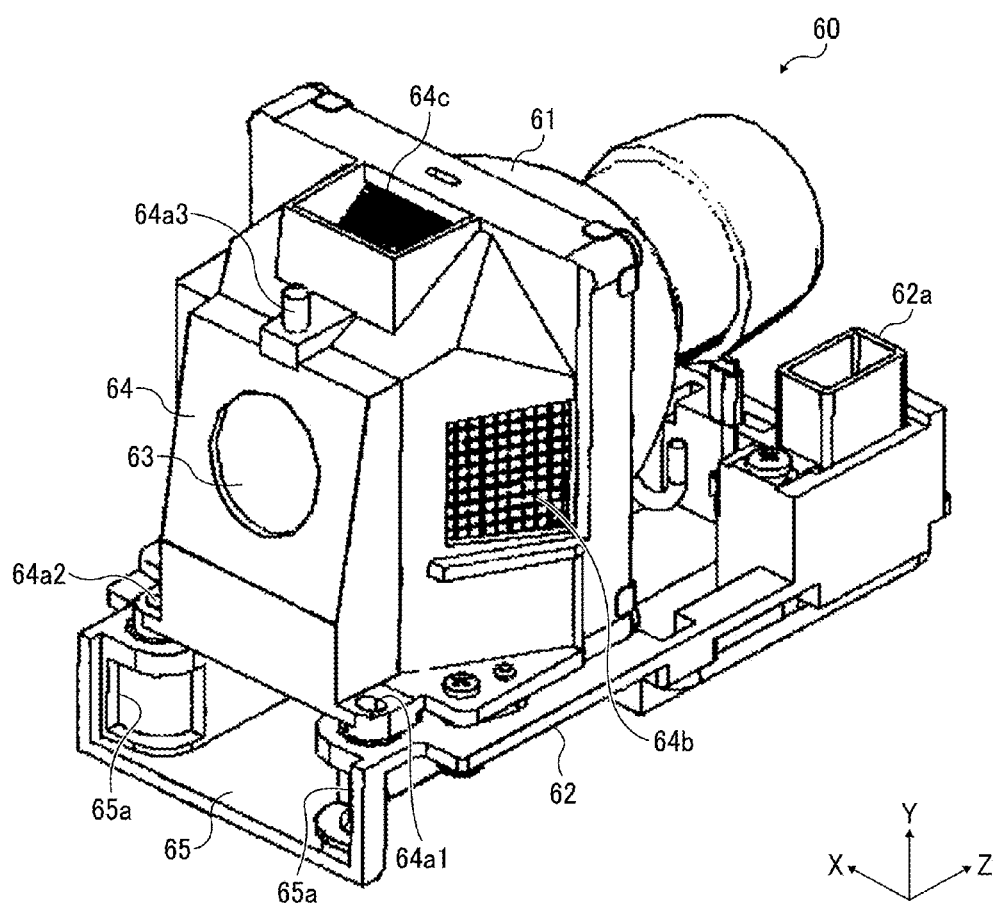
FIG. 5 is a perspective view of the light source according to an embodiment of the present invention.

FIG. 5 is a schematic perspective view of the light source unit 60.

The light source unit 60 has a light source bracket 62, and a light source 61 such as a halogen lamp, a metal halide lamp, or a high-pressure mercury lamp that is mounted on the upper surface of the light source bracket 62. The light source bracket 62 is provided with a connector 62a to connect to a power supply connector connected to a power supply unit (not illustrated). The connector 62a is provided on one end side in a longitudinal direction (Z-direction) of the light source unit 60.

Furthermore, on the light emitting side of the light source 61 at the top of the light source bracket 62, (the other end side in the longitudinal direction of the light source unit 60), a holder 64 as a holding member on which a reflector (not illustrated) is held is screwed. On the surface of the holder 64 on the opposite side to the arrangement side of the light source 61, an emission window 63 is provided. Light emitted from the light source 61 is focused on the emission window 63 by a reflector (not illustrated) held by the holder 64, and is emitted from the emission window 63.

Furthermore, on the upper surface of the holder 64, and at both ends in the X-direction of the lower surface of the holder 64, light source positioning units 64a1, 64a2, and 64a3 for positioning the light source unit 60 at the lighting bracket 26 (see FIG. 6) of the illumination unit 20 are provided. The two light source positioning units 64a1 and 64a2 provided on the lower surface of the holder 64 are formed as holes. The light source positioning unit 64a3 provided on the upper surface of the holder 64 is formed as a projection.

Furthermore, on the side surface of the holder 64, a light source air supply port 64b into which air for cooling the light source 61 flows is provided, and on the upper surface of the holder 64, a light source exhaust duct 64c through which the air heated by heat of the light source 61 is exhausted is provided.

The light source bracket 62 is provided with a handle 68 in which a user picks the handle with his fingers to extract the light source unit 60 at the time of replacement of the light source unit 60. The handle 68 is rotatably attached to the light source bracket 62 at the substantially center of the connector 62a and the light source positioning units 64a1 and 64a2 in the longitudinal direction of the light source bracket 62 (Z-direction in the drawings). The handle 68 may also have an appropriate shape to the extent that a user picks the handle with finger leading ends, in addition to the illustrated shape.

Figure 6:
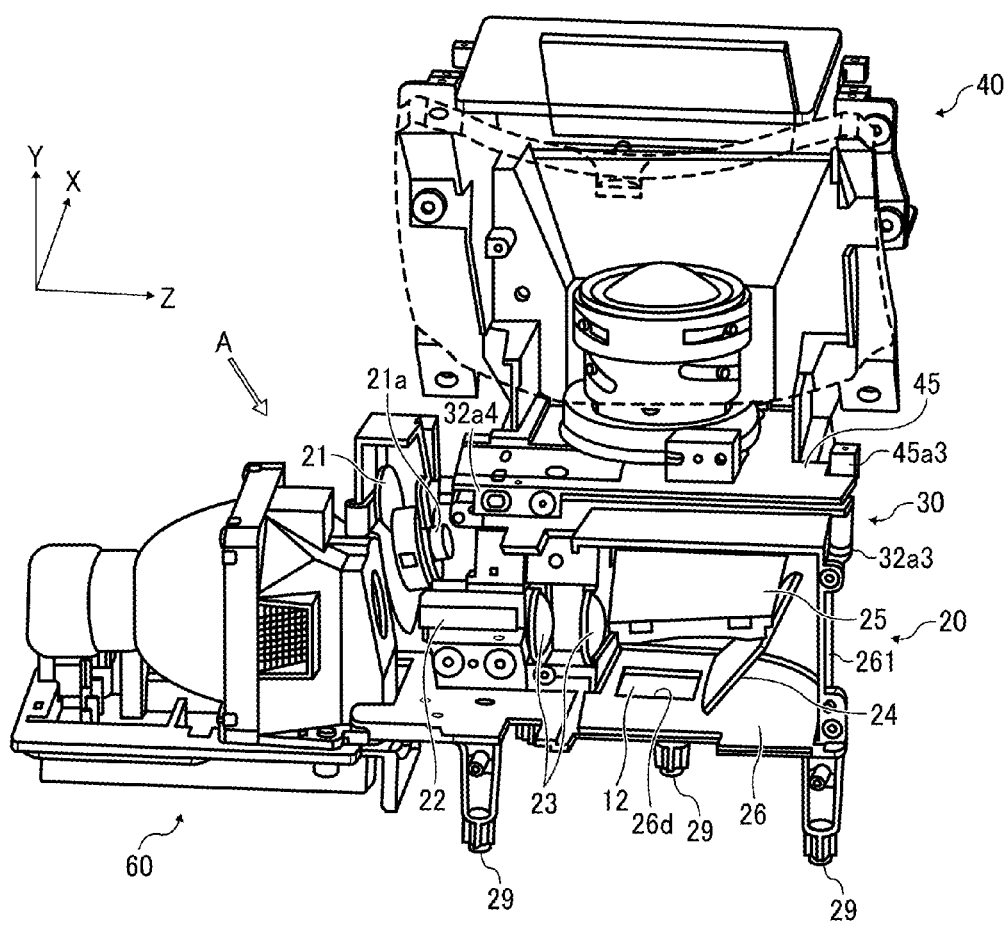
FIG. 6 is a perspective view of an illumination unit according to an embodiment of the present invention.

FIG. 6 is a perspective view of the illumination unit 20 which illustrates the optical system components stored in the illumination unit 20 along with other components.

Figure 7:
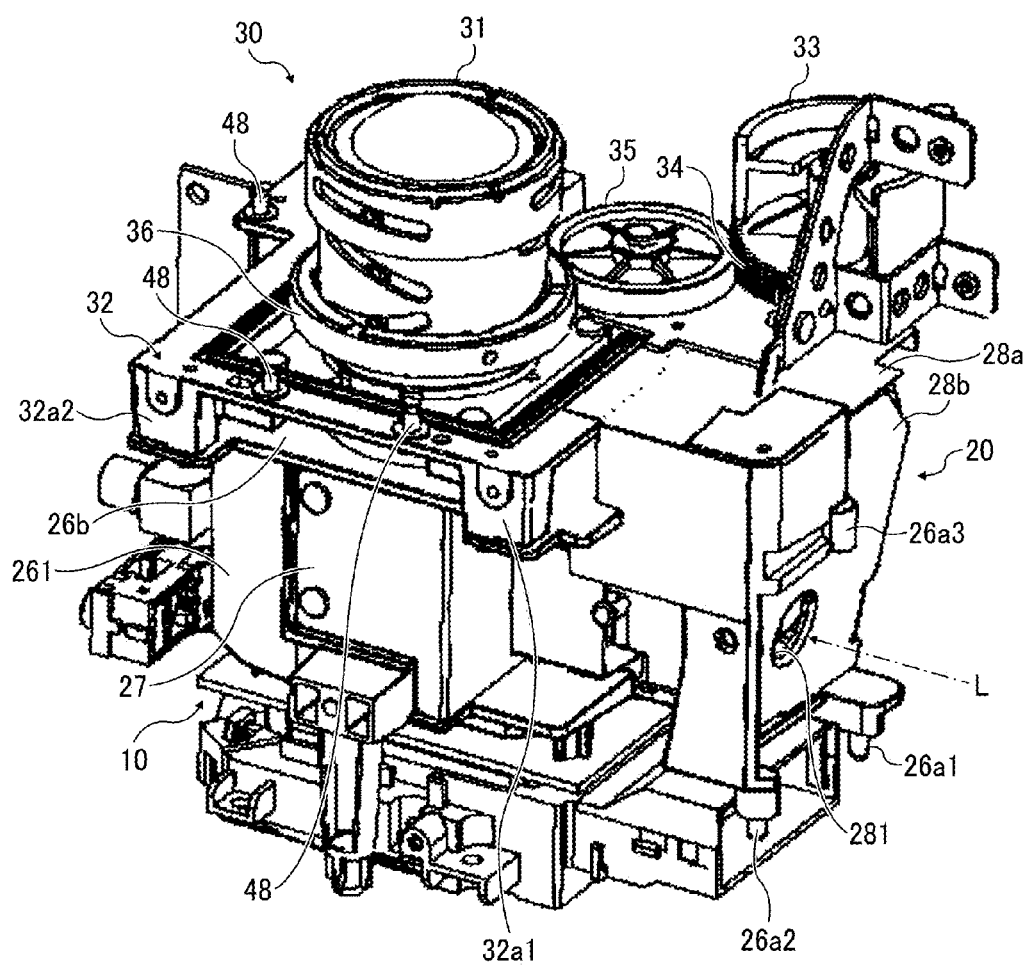
FIG. 7 is a perspective view of the illumination unit, the projection lens, and the light modulator according to an embodiment of the present invention as viewed from a direction A of FIG. 6.
Figure 7:
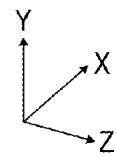

As illustrated in FIG. 7, the illumination unit 20 has a color wheel 21, a light tunnel 22, two sheets of relay lenses 23, a cylindrical mirror 24, and a concave mirror 25. These components are held in the lighting bracket 26. The lighting bracket 26 has a box-shaped portion 261 in which two sheets of relay lenses 23, the cylindrical mirror 24, and the concave mirror 25 are housed. Among four side surfaces of the box-shaped portion 261, only a right side of the drawings has a side surface, and other three surfaces have an opened shape. Moreover, an OFF light plate 27 (see FIG. 8) is attached to the side surface opening of the back side in the X-direction in the drawings, and a cover member (not illustrated) is attached to the side surface opening of the front side in the X-direction of the drawings. Thus, the two sheets of relay lenses 23, the cylindrical mirror 24, and the concave mirror 25 housed in the box-shaped portion 261 of the lighting bracket 26 are covered by the lighting bracket 26, the OFF light plate 27, and a cover member.

Furthermore, on the lower surface of the box-shaped portion 261 of the lighting bracket 26, an irradiating through-hole 26d through which the DMD 12 is exposed is formed.

In addition, the lighting bracket 26 has three legs 29. The legs 29 support the weight of the first projection optical system 30 and the second projection optical system 40 fixed by being stacked on the lighting bracket 26, while coming into contact with a base member 53 (see FIG. 13) of the projector 1. Furthermore, by providing the legs 29, a space for allowing outdoor air to flow in is formed in a heat sink 13 (see FIG. 8) as a cooling unit for cooling the DMD 12 of the light modulator 10.

In addition, reference numerals 32a3 and 32a4 illustrated in FIG. 6 are the legs of the lens holder 32 of the first projection optical system 30, and reference numeral 45a3 is a screw unit 45a3 of the second projection optical system 40.

FIG. 7 is a perspective view of the illumination unit 20, the first projection optical system 30, and the light modulator 10 as viewed from a direction A in FIG. 6.

The first projection optical system 30 is disposed above the illumination unit 20, and has a projection lens 31 that holds the first optical system 70 (see FIG. 3) formed by a plurality of lenses, and a lens holder 32 that holds the projection lens 31. Four legs 32a1 to 32a4 extending downward are provided in the lens holder 32 (in FIG. 7, only the legs 32a1 and 32a2 are illustrated, and the legs 32a3 and 32a4 are illustrated in FIG. 6), and on the bottom surfaces of the respective legs 32a1 to 32a4, screw holes for being screwed into the lighting bracket 26 are formed.

An upper surface 26b orthogonal to the Y-direction of the drawing is provided above the box-shaped portion 261 of the lighting bracket 26. At four corners of the upper surface 26b, through-holes (not illustrated) are provided through which screws for screwing the first projection optical system 30 pass. By inserting the screws from the through-holes to be inserted into the screw holes formed on the bottom surfaces of the respective legs 32a1 to 32a4, the first projection optical system 30 is fastened to the illumination unit 20.

Furthermore, a focus gear 36 is provided in the projection lens 31, and an idler gear 35 is meshed with the focus gear 36. A lever gear 34 is meshed with the idler gear 35, and the focus lever 33 is fixed to a rotary axis of the lever gear 34. As illustrated in FIG. 1, a leading end of the focus lever 33 is exposed from the apparatus main body.

When moving the focus lever 33, the focus gear 36 rotationally moves via the lever gear 34 and the idler gear 35. When the focus gear 36 rotationally moves, the plurality of lenses constituting the first optical system 70 in the projection lens 31 moves in a predetermined direction, respectively, and the focus of the projection image is adjusted.

Furthermore, the lens holder 32 has screw through-holes through which the screws 48 for screwing the second projection optical system 40 into the first projection optical system 30 pass, at four positions, (in FIG. 7, three screw through-holes are illustrated, a state in which the screws 48 pass through each of the screw through-holes is illustrated, and the leading ends of the screw units of the screws 48 are illustrated in FIG. 7).

In the opening of the lighting bracket upper surface 26b, a light shielding plate (not illustrated) to which the lower part of the projection lens 31 is fitted is provided, thereby preventing light from entering the box-shaped portion 261 from the upper part.

At the side end of the color wheel 21 of the lighting bracket 26 (a front side in the Z-direction in FIG. 7), a cylindrical light source positioning target unit 26a3 vertically formed with the through-holes is provided, and a protruding light source positioning unit 64a3 (see FIG. 5) provided on the upper surface of the holder 64 of the light source unit 60 described above is fitted to the through-holes. Furthermore, two protruding light source positioning target units 26a1 and 26a2 to which two hole-shaped light source positioning units 64a1 and 64a2 provided on the light source bracket 62 side of the holder 64 are fitted are provided below the light source positioning target unit 26a3. Moreover, the three light source positioning units 64a 1 to 64a3 of the holder 64 are fitted to the light source positioning target units 26a1 to 26a3 of three positions provided in the lighting bracket 26 of the illumination unit 20, and thus, the light source unit 60 is positioned and fixed to the illumination unit 20 (see FIG. 4).

Furthermore, the lighting bracket 26 is provided with a lighting cover 28a that covers the color wheel 21 and the light tunnel 22, and a wheel cover 28b that covers the surface of the color wheel 21 facing the light source 61. The wheel cover 28b is provided with a through-hole 281 for allowing light from the light source 61 to pass therethrough.

Figure 8:
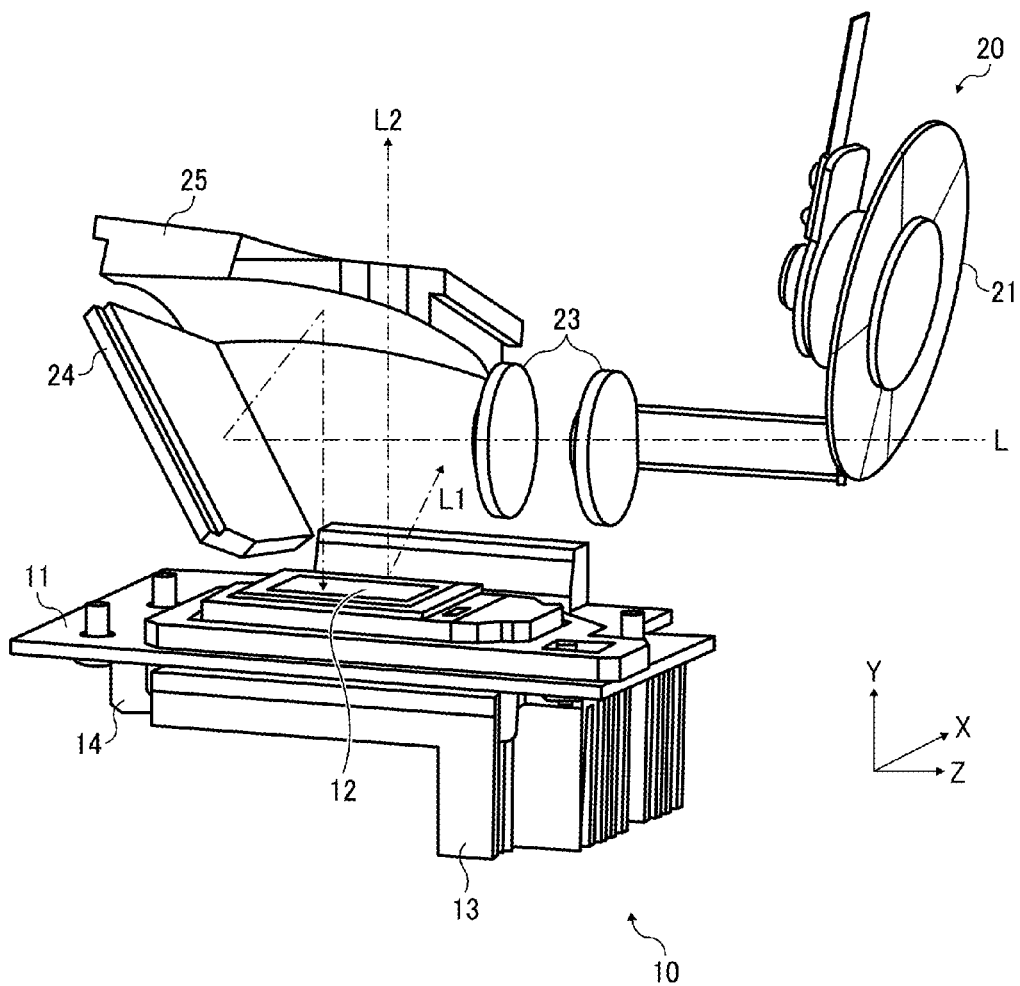
FIG. 8 is an explanatory diagram illustrating the optical path in the illumination unit according to an embodiment of the present invention.

FIG. 8 is an explanatory view illustrating an optical path L in the illumination unit 20.

The color wheel 21 has a disk shape and is fixed to the rotating part of the color motor 21a. In the color wheel 21, filters of R (red), G (green), B (blue) and the like are provided in a rotational direction. Light collected by a reflector (not illustrated) provided on the holder 64 of the light source unit 60 reaches the peripheral edge of the color wheel 21 through the emission window 63. Light reaching the peripheral edge of the color wheel 21 is divided into light of R, G, and B in the time division by the rotation of the color wheel 21.

Light divided by the color wheel 21 is incident on the light tunnel 22. The light tunnel 22 has a rectangular box shape, and an inner peripheral surface thereof is a mirror surface. Light incident on the light tunnel 22 becomes a uniform surface light source and is emitted toward the relay lens 23, while being reflected by the inner peripheral surface of the light tunnel 22 several times.

Light passed through the light tunnel 22 transmits through two relay lenses 23, is reflected by the cylindrical mirror 24 and the concave mirror 25, and is focused on an image generation surface of the DMD 12 to form the image.

Figure 9:
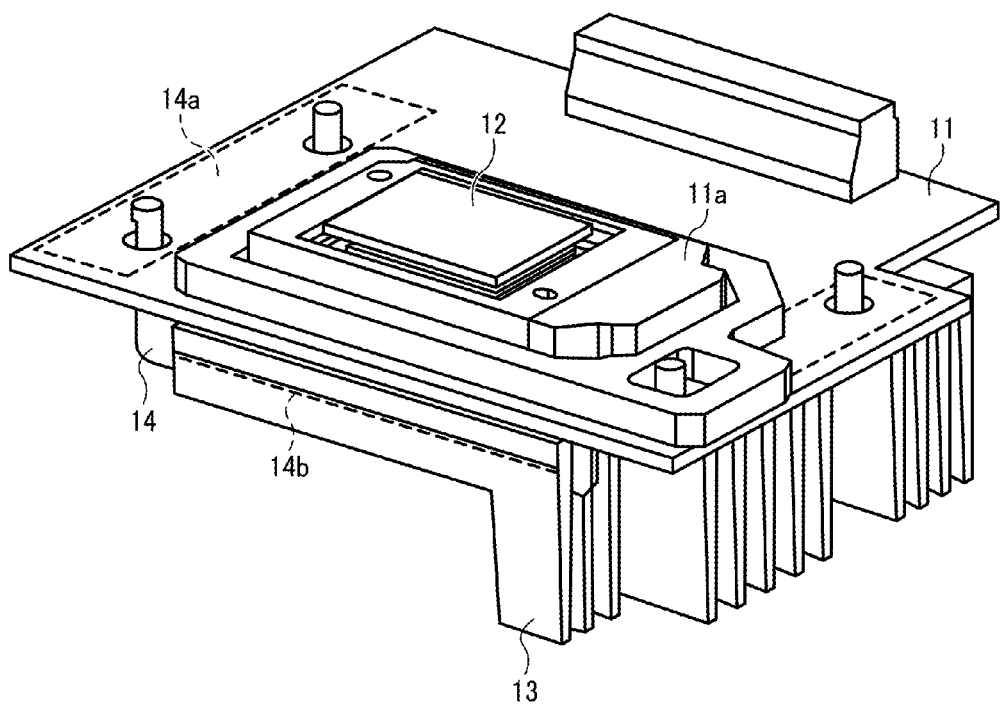
FIG. 9 is a perspective view of the light modulator according to an embodiment of the present invention.

FIG. 9 is a perspective view of the light modulator 10.

As illustrated in FIG. 9, the light modulator 10 is provided with a DMD board 11 on which the DMD 12 is mounted. The DMD 12 is mounted on a socket 11a provided in the DMD board 11, while causing the image generation surface in which the micro mirrors are arranged in a grid shape to face upward. In the DMD board 11, a drive circuit or the like for driving the DMD mirrors is provided. On the back surface of the DMD board 11, (surface on an opposite side to the surface on which the socket 11a is provided), the heat sink 13 as a cooling unit for cooling the DMD 12 is fixed. Through-holes (not illustrated) pass through the position of the DMD board 11 at which the DMD 12 is mounted. Projections (not illustrated) to be inserted into the through-holes are formed in the heat sink 13. A leading end of the projection has a flat shape. The projections are inserted into the through-holes (not illustrated) to bring the planes of the leading ends of the projections into contact with the back surface (surface of an opposite side to the image generation surface) of the DMD 12. An elastically deformable heat transfer sheet may be adhered to the plane and the position at which the heat sink 13 comes into contact with the back surface of the DMD 12, thereby enhancing the adhesion between the plane of the projection and the back surface of the DMD 12, and enhancing thermal conductivity.

The heat sink 13 is pressed against and fixed to the surface on an opposite side to the surface of the DMD board 11 on which the socket 11a is provided, by the fixing member 14. The fixing member 14 has a plate-like fixing portion 14a facing a portion of a right side of FIG. 9 of the back surface of the DMD board 11, and a plate-like fixing portion 14a facing a portion of a left side of FIG. 9 of the back surface of the DMD board 11. A pressing portion 14b provided so as to connect the left and right fixing portions is provided near one end and the other end in the X-direction of the respective fixing portions.

When screwing the light modulator 10 into the lighting bracket 26 (see FIG. 6), the heat sink 13 is pressed against and fixed to the surface on an opposite side to the surface of the DMD board 11 on which the socket 11a is provided, by the fixing member 14.

Hereinafter, the operation of fixing the lighting bracket 26 of the light modulator 10 will be described. First, the light modulator 10 is positioned at the lighting bracket 26 so that the DMD 12 faces the opening surface of the irradiating through-hole 26d provided on the lower surface of the lighting bracket 26 of the illumination unit 20 illustrated in FIG. 6.

Next, the screw is inserted from the lower side of FIG. 6 so as to pass through a through-hole (not illustrated) provided on the fixing portion 14a and the through-hole 15 of the DMD board 11. Moreover, by screwing the screw into the screw hole provided on the lower surface of a screw stopper 263 (see FIG. 4) provided in the lighting bracket 26, the light modulator 10 is fixed to the lighting bracket 26. Furthermore, when screwing the screw to the screw stopper 263 provided in the lighting bracket 26, the pressing portion 14b presses the heat sink 13 against the DMD board side. Thus, the heat sink 13 is pressed against and fixed to the surface of an opposite side to the surface of the DMD board 11 on which the socket 11a is provided, by the fixing member 14.

In this way, the light modulator 10 is fixed to the lighting bracket 26, and three legs 29 illustrated in FIG. 6 also support the weight of the light modulator 10.

On the image generation surface of the DMD 12, a plurality of movable micro mirrors is arranged in a grid shape. Each micro mirror is able to slope the mirror surface around a torsion axis at a predetermined angle and is able to have two states of "ON" and "OFF". When the micro mirror is in the state of "ON", as illustrated by an arrow L2 in FIG. 8, the micro mirror reflects light from the light source 61 toward the first optical system 70 (see FIG. 3). When the micro mirror is in the state of "OFF", the micro mirror reflects light from the light source 61 toward the OFF light plate 27 held on the side surface of the lighting bracket 26 illustrated in FIG. 7 (see the arrow L1 of FIG. 8). Therefore, by individually driving each mirror, it is possible to control the projection of light for each pixel of the image data, thereby generating the image.

Light reflected toward the OFF light plate 27 (not illustrated) is absorbed in the form of heat and is cooled by the flow of the outdoor air.

Figure 10:
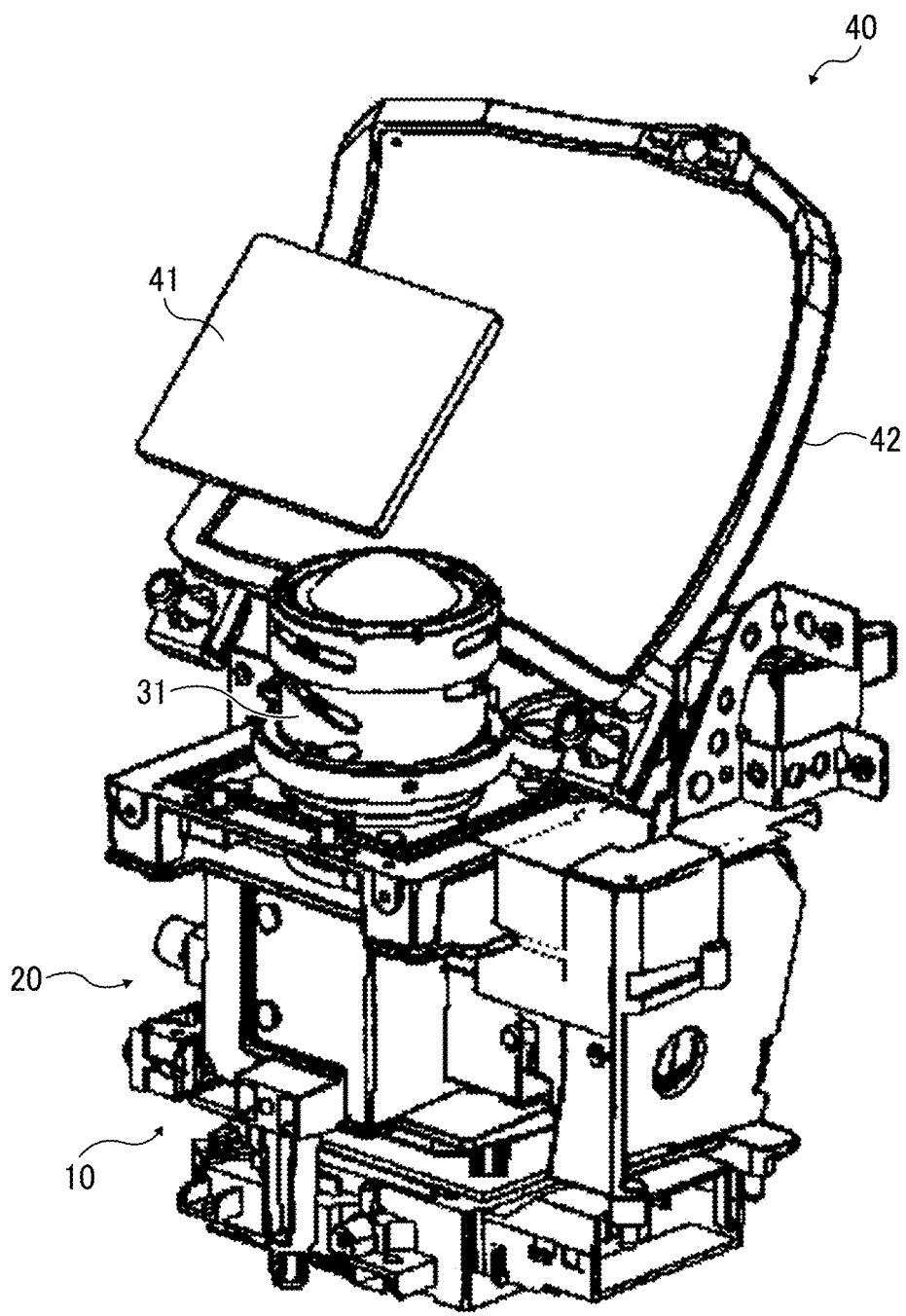
FIG. 10 is a perspective view illustrating a second optical system held by a second projection optical system according to an embodiment of the present invention, together with the projection lens, the illumination unit, and the light modulator.

FIG. 10 is a perspective view illustrating a second optical system included in the second projection optical system 40, together with the projection lens 31, the illumination unit 20, and the light modulator 10. As illustrated in FIG. 10, the second projection optical system 40 is provided with a folding mirror 41 forming the second optical system, and a curved mirror 42 having a concave shape. The surface that reflects light of the curved mirror 42 can have a spherical shape, a rotationally symmetric aspherical surface shape, a free curved surface shape or the like.

Figure 11:
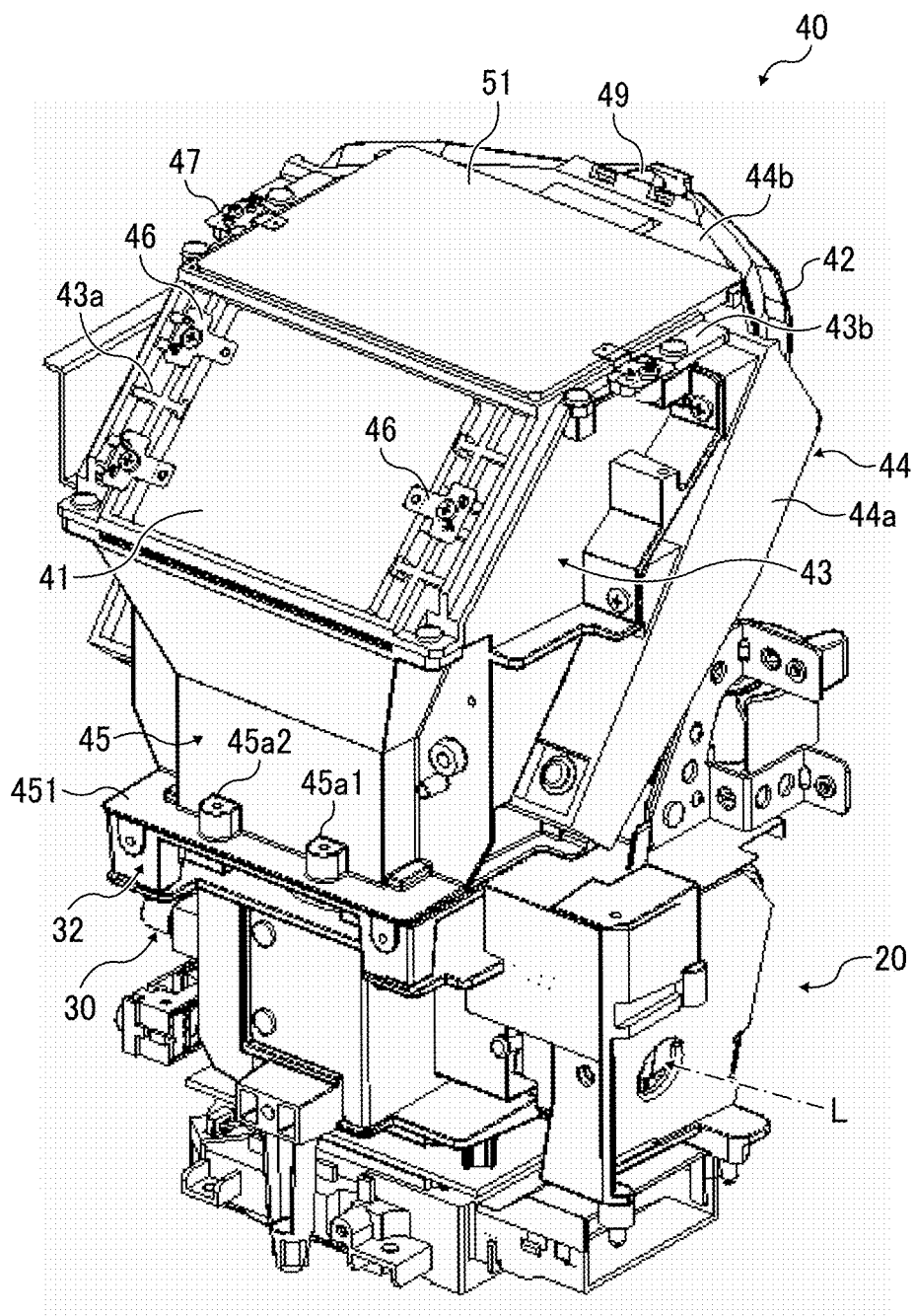
FIG. 11 is a perspective view illustrating the second projection optical system according to an embodiment of the present invention, together with a first projection optical system, the illumination unit, and the light modulator.

FIG. 11 is a perspective view illustrating the second projection optical system 40, together with the first projection optical system 30, the illumination unit 20, and the light modulator 10. As illustrated in FIG. 11, the second projection optical system 40 is also provided with a dust-proof glass 51 that transmits the light image reflected from the curved mirror 42 and protects the optical system components in the apparatus from dust. In addition, symbol L in the FIG. 11 indicates radiated light from the light source.

The second projection optical system 40 has a mirror bracket 43 that holds the folding mirror 41 and the dust-proof glass 51. Furthermore, the second projection optical system 40 has a free mirror bracket 44 configured to hold the curved mirror 42, and a mirror mount 45 to which the mirror bracket 43 and the free mirror bracket 44 are attached.

The mirror mount 45 has a box-like shape, the upper surface, the lower surface, and the back side thereof in the X-direction in the drawings are opened, and the mirror mount 45 is in the form of a substantially U-shape when viewed from above. Edges extending in the X-direction in each of the front side and the back side in the Z-direction of the upper opening of the mirror mount 45 are formed of a slope, and a parallel portion. The slope is sloped so as to rise toward the back side in the X-direction from the front side end in the X-direction in the drawings. The parallel portion is parallel to the X-direction in the drawings. In addition, the slope is located on the front side in the X-direction in the drawings from the parallel portion. Furthermore, edges extending in the Z-direction on the front side in the X-direction of the drawings of the upper opening of the mirror mount 45 are parallel to the Z-direction in the drawings.

The mirror bracket 43 is attached to the top of the mirror mount 45. The mirror bracket 43 has a sloped face 43*a* that is sloped so as to rise toward the back side in the X-direction from the front side end in the X-direction in the drawings coming into contact with the slope of the upper opening edge of the mirror mount 45. Furthermore, the mirror bracket 43 also has a parallel surface 43*b* parallel to the X direction that comes into contact with the parallel portion of the upper opening edge of the mirror mount 45. The sloped face 43*a* and the parallel surface 43*b* have the opening, respectively, the folding mirror 41 is held so as to close the opening of the sloped face 43*a*, and the dust-proof glass 51 is held so as to close the opening of the parallel surface 43*b*.

Both ends in the Z-direction of the folding mirror 41 are pressed against the sloped face 43*a* of the mirror bracket 43 by a mirror pressing member 46 having a flat spring shape, and thus, the folding mirror 41 is positioned and held on the sloped face 43*a* of the mirror bracket 43. One end in the Z-direction of the folding mirror 41 is fixed by two mirror pressing members 46, and the other end thereof is fixed by one mirror pressing member 46.

Both ends in the Z-direction of the dust-proof glass 51 are pressed against the parallel surface 43*b* of the mirror bracket 43 by a glass pressing member 47 having the flat spring shape, and thus, the dust-proof glass 51 is positioned and fixed to the mirror bracket 43. The dust-proof glass 51 is held by the one glass pressing member 47 at each of both ends in the Z-direction.

The free mirror bracket 44 configured to hold the curved mirror 42 has arms 44*a* sloped so as to descend toward the front side from the back side in the X-direction of the drawings, on the front side and the back side in the Z-axis direction. Furthermore, the free mirror bracket 44 has a connector 44*b* that connects the two arms 44*a* at the top of the arms 44*a*. The arms 44*a* of the free mirror bracket 44 are attached to the mirror mount 45 so that the curved mirror 42 covers the opening of the back side in the X-direction in the drawings of the mirror mount 45.

At the upper end of the curved mirror 42, a substantially center of an end at the side of the dust-proof glass 51 is pressed against the connector 44*b* of the free mirror bracket 44 by a free mirror pressing member 49 having the flat spring shape. Furthermore, both ends in the Z-axis direction in the drawings of the first optical system side of the curved mirror are fixed to the arms 44*a* of the free mirror bracket 44 by the screws.

The second projection optical system 40 is loaded and fixed to the lens holder 32 of the first projection optical system 30. Specifically, a lower surface 451 facing the upper surface of the lens holder 32 is provided below the mirror mount 45. Tubular screw stoppers 45*a*1 to 45*a*3 for being screwed to the first projection optical system 30 are formed at four positions of the lower surface 451 (the screw stoppers 45*a*1 and 45*a*2 are illustrated in FIG. 11, the screw stopper 45*a*3 is illustrated in FIG. 6, and the remaining screw stoppers are not illustrated). The second projection optical system 40 is screwed to the first projection optical system 30, by allowing the screws 48 to pass through screw through-holes provided in the lens holder 32 of the first projection optical system 30, and by screwing the screws 48 to the screw stoppers 45*a*1 to 45*a*3.

When the second projection optical system 40 is loaded and fixed to the lens holder 32 of the first projection optical system 30, as illustrated in FIG. 7, a portion above the lens holder 32 of the projection lens 31 is housed in the mirror mount 45 of the second projection optical system 40. Furthermore, when the second projection optical system 40 is loaded and fixed to the lens holder 32, a gap is present between the curved mirror 42 and the lens holder 32, and the idler gear 35 (see FIG. 7) enters the gap.

Figure 12:
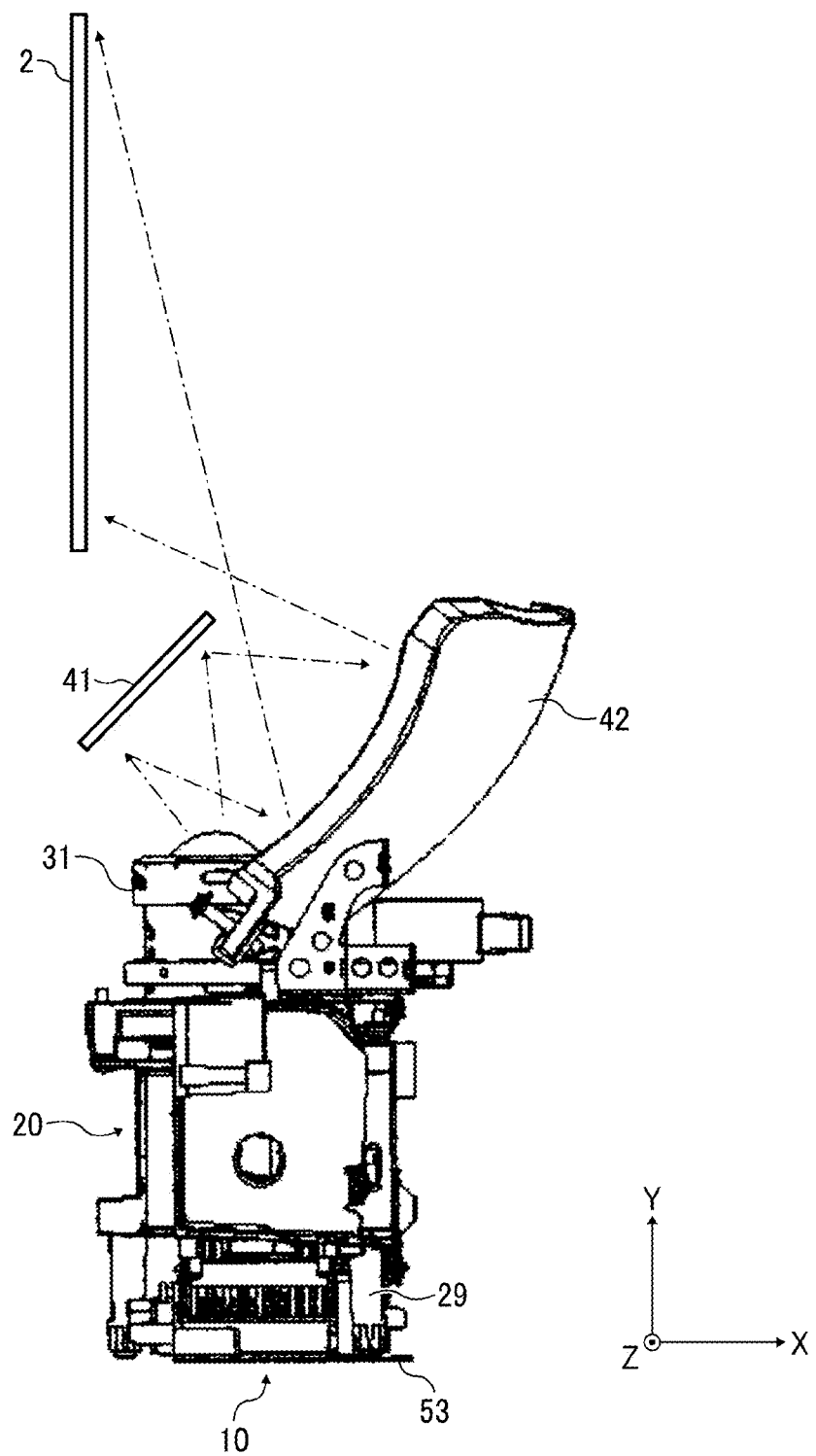
FIG. 12 is a perspective view illustrating the optical path from the first optical system to the projection plane according to an embodiment of the present invention.

FIG. 12 is a perspective view illustrating the optical path from the first optical system 70 to the projection plane 2 (screen).

Optical flux transmitted through the projection lens 31 constituting the first optical system 70 forms a conjugated intermediate image on the image generated in the DMD 12 between the folding mirror 41 and the curved mirror 42. This intermediate image is imaged as a curved surface image between the folding mirror 41 and the curved mirror 42. Next, the diverging optical flux after imaging the intermediate image is incident on the curved mirror 42 having the concave shape, is converted into a convergent optical flux, converts the intermediate image into "further expanded image" by the curved mirror 42, and projects the image onto the projection plane 2.

Thus, the projection optical system is constituted by the first optical system 70 and the second optical system, and the intermediate image is formed between the first optical system 70 and the curved mirror 42 of the second optical system and is expanded and projected by the curved mirror 42, thereby being able to shorten the projection distance, and to use the projection optical system in a small conference room or the like.

Furthermore, as illustrated in FIG. 12, the first projection optical system 30 and the second projection optical system 40 are loaded and fixed to the lighting bracket 26. The light modulator 10 is also fixed. Thus, the legs 29 of the lighting bracket 26 are fixed to the base member 53 so as to support the weight of the first projection optical system 30, the second projection optical system 40, and the light modulator 10.

Figure 13:
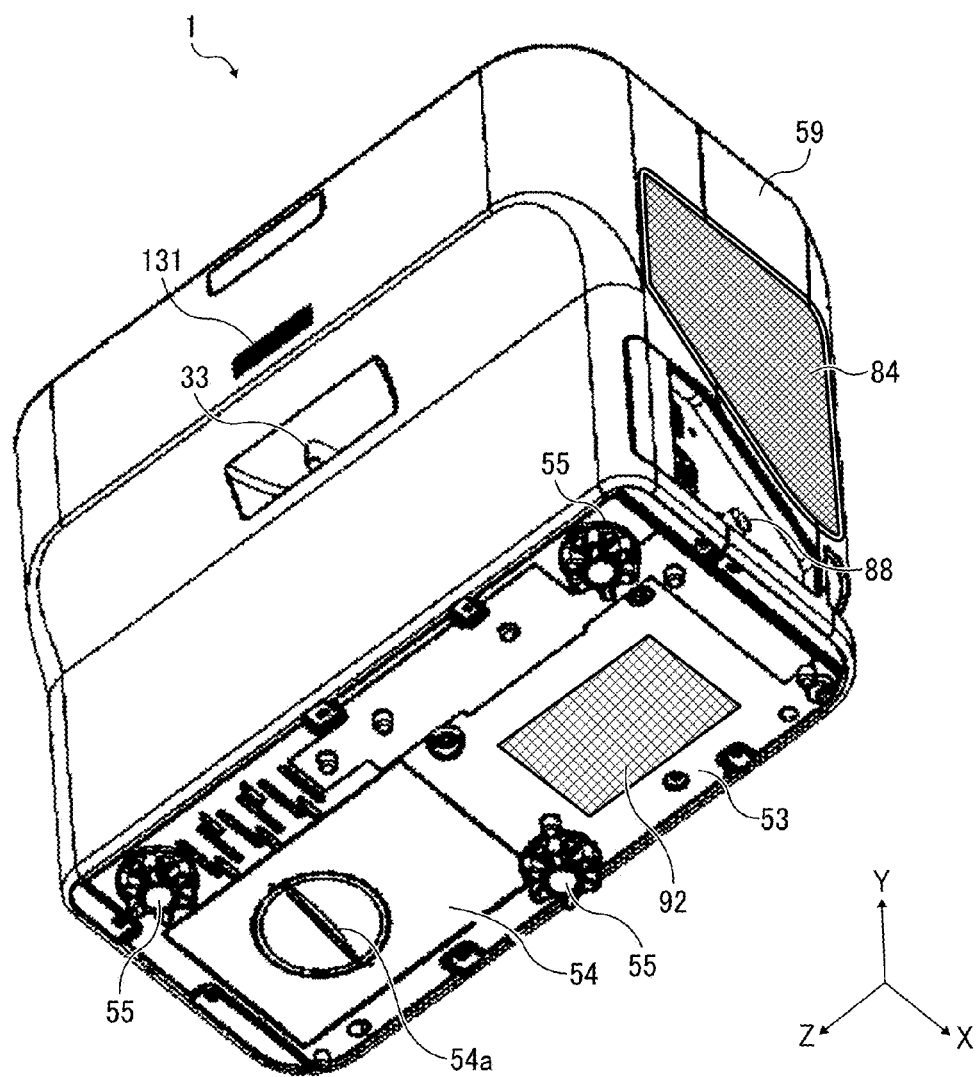
FIG. 13 is a perspective view illustrating the projector on an installation surface side according to an embodiment of the present invention.

FIG. 13 is a perspective view illustrating an installation surface side of the projector 1.

As illustrated in FIG. 13, an opening and closing cover 54 is provided in the base member 53 that forms the lower surface of the projector 1, and a rotary operation unit 54*a* is provided in the opening and closing cover 54. When rotating the rotary operation unit 54*a*, fixing between the opening and closing cover 54 and the apparatus main body is released, and the opening and closing cover 54 can be detached from the apparatus main body. Furthermore, at the position of the base member 53 that faces the DMD 12, a first intake duct 92 for cooling the DMD is provided.

Figure 14:
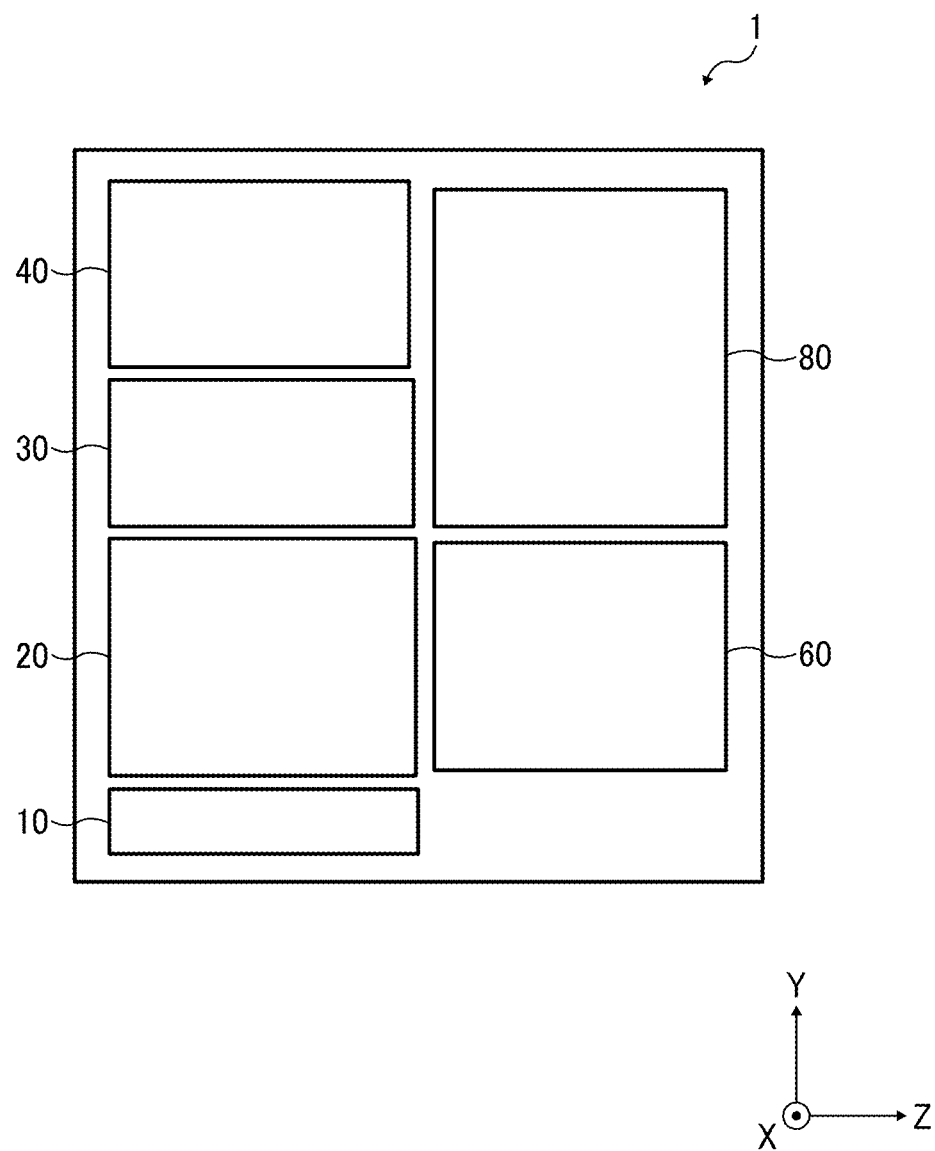
FIG. 14 is a schematic diagram illustrating an arrangement relation of each part in the apparatus according to an embodiment of the present invention.

FIG. 14 is a schematic view illustrating an arrangement relation of each part in the apparatus.

As illustrated in FIG. 14, the light modulator 10, the illumination unit 20, the first projection optical system 30, and the second projection optical system 40 are stacked and disposed in the Y-direction which is the minor axis direction of the projection plane. The light source unit 60 is disposed in the Z-direction that is the major axis direction of the projection plane with respect to the stack in which the light modulator 10, the illumination unit 20, the first projection optical system 30, and the second projection optical system 40 are stacked. Thus, in this embodiment, the light modulator 10, the illumination unit 20, the first projection optical system 30, the second projection optical system 40, and the light source unit are arranged side by side in the Y-direction or the Z-direction that is a direction parallel to the projection image and the projection plane 2. More specifically, the light source unit 60 is connected to the image forming unit 101 in a direction perpendicular to the direction in which the image forming unit 101 formed by the light modulator 10 and the illumination unit 20, and the projection optical system 102 formed by the first projection optical system 30 and the second projection optical system 40 are stacked. Furthermore, the image forming unit 101 and the light source unit 60 are disposed on the same straight line parallel to the base member 53. Furthermore, the image forming unit 101 and the projection optical system 102 are disposed on the same straight line perpendicular to the base member 53, and the image forming unit 101 and the projection optical system 102 are disposed from the base member 53 side in this order. This can suppress the installation space of the apparatus from being taken in the direction perpendicular to the plane of the projection image that is projected onto the projection plane 2. Thus, it is possible to suppress the apparatus from interfering with the arrangement of tables and chairs even in a narrow room, when the image projector is used by being placed on the table or the like.

Figure 15:
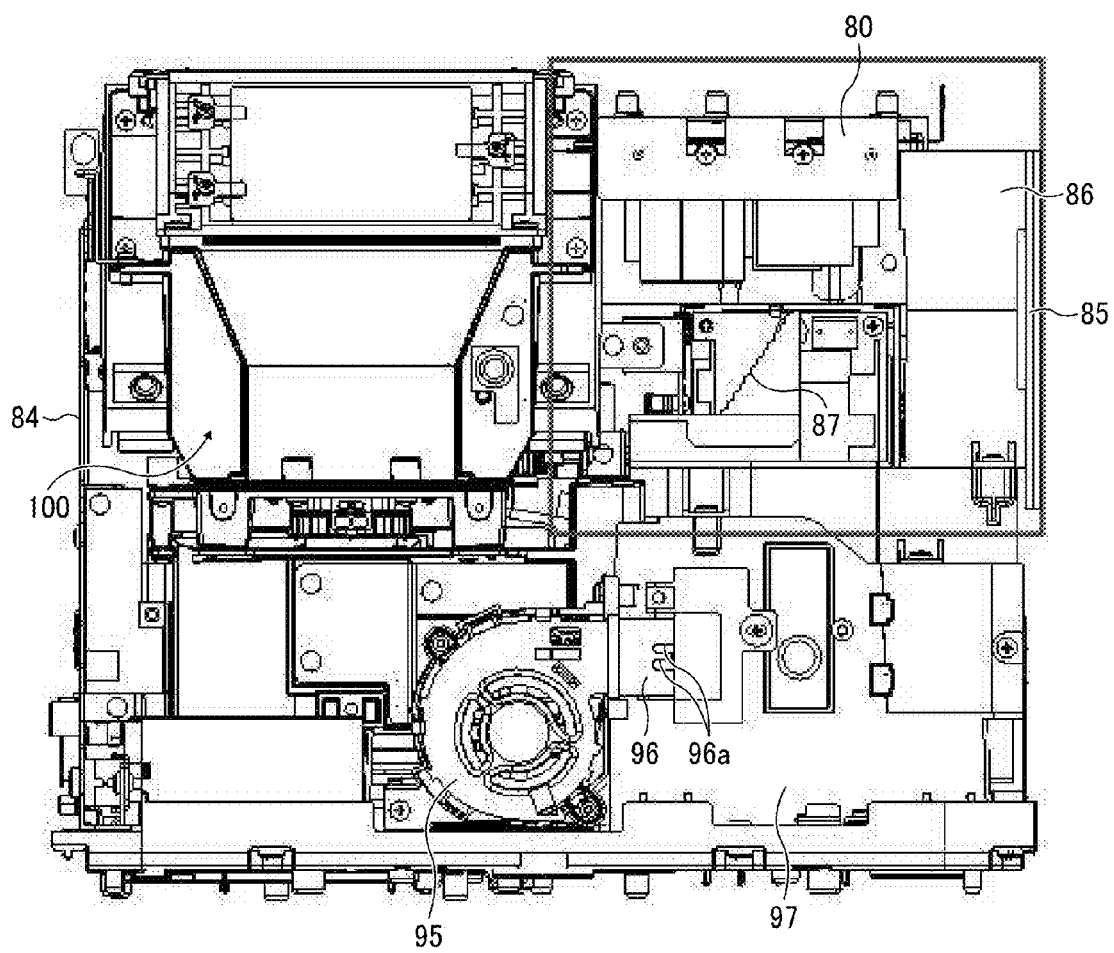
FIG. 15 is a diagram illustrating an internal configuration of the projector according to an embodiment of the present invention.
Figure 16:
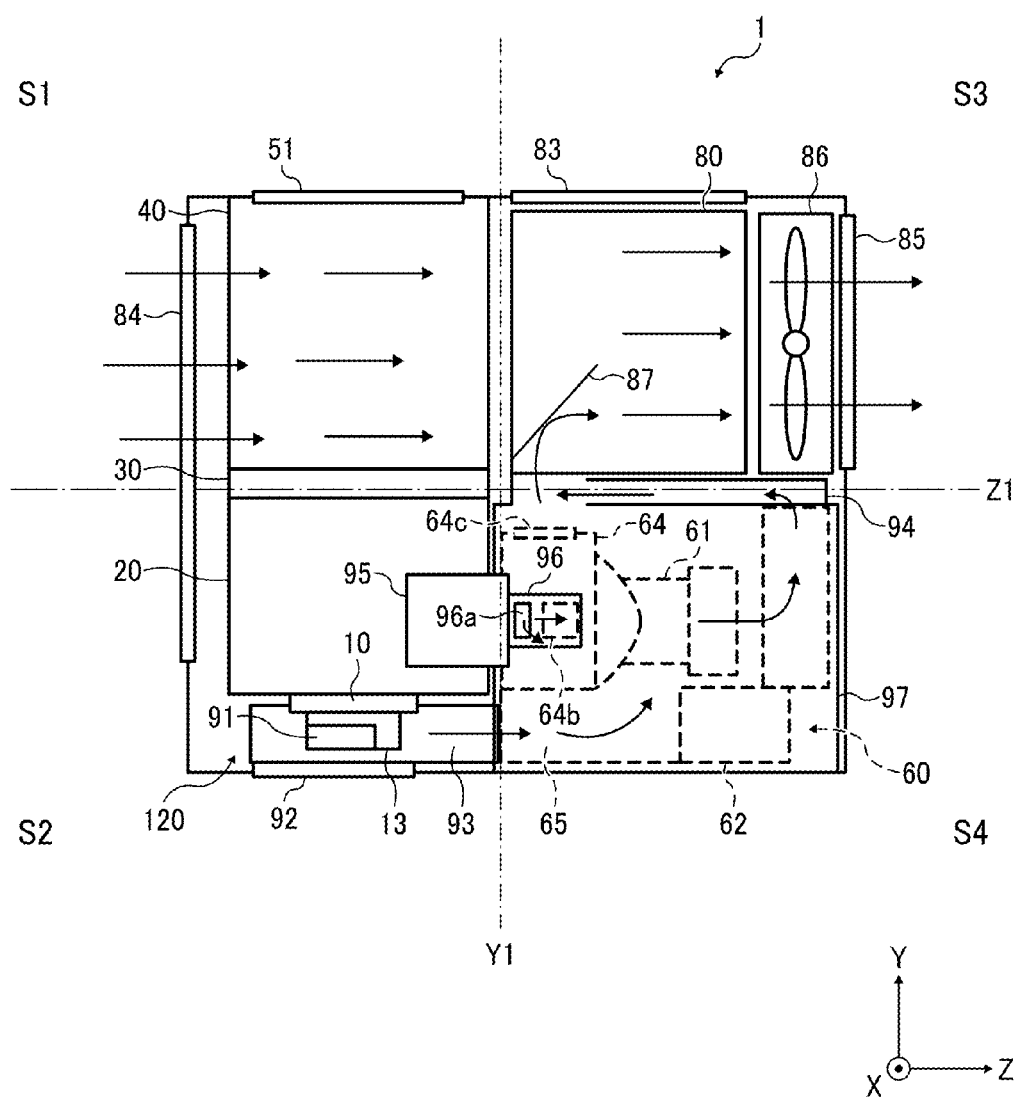
FIG. 16 is an explanatory diagram illustrating the flow of air in the projector according to an embodiment of the present invention.

FIG. 15 is a diagram illustrating an internal configuration of the projector 1, and FIG. 16 is an explanatory view illustrating the flow of air in the projector. FIGS. 15 and 16 are schematic views illustrating the projector 1 from the direction perpendicular to the projection plane 2 (X-direction).

As illustrated FIGS. 15 and 16, a second intake duct 84 opened for taking air outside the apparatus into the projector 1 is provided on one side (left side in FIGS. 15 and 16) of the side surfaces of the projector 1. An intake fan is not disposed in the second intake duct 84. Furthermore, an exhaust duct 85 opened to exhaust the air inside the projector 1 is provided on the other side (right side in FIGS. 15 and 16) of the side surface of the projector 1. Furthermore, an exhaust fan 86 is provided to face the exhaust duct 85.

Parts of the exhaust duct 85 and the second intake duct 84 are provided between the light source unit 60 and the operation unit 83, when the projector 1 is viewed from the direction perpendicular to the projection plane 2 (X-direction). Thus, the air outside the apparatus taken from the second intake duct 84 goes around the gap between the lower surface of the curved mirror 42 illustrated in FIG. 6 and the lens holder 32, and the Z-Y plane of the mirror mount 45 of the second projection optical system 40 and the back surface of the curved mirror 42. Moreover, the air moves toward the exhaust duct 85 while flowing along the back surface of the mirror mount 45 and the curved mirror 42. Furthermore, a part of the air outside the apparatus taken from the second intake duct 84 is further sucked to the light source blower 95 in the housing, and flows to the light source unit 60. A power supply device 80 placed on the top of the light source unit 60 has a shape in which the U-shaped light source unit 60 side is opened by the arrangement of the three substrates, when viewed from the Z-direction of the drawings.

By providing the parts of the exhaust duct 85 and the second intake duct 84 so as to be located between the light source unit 60 and the operation unit 83 when the projector 1 is viewed from the direction perpendicular to the projection plane 2 (X-direction), it is possible to obtain the following effects. That is, there is an effect in which it is possible to generate the airflow discharged from the exhaust duct 85 through between the light source unit 60 and the operation unit 83.

Furthermore, the light source blower 95 is disposed at a position at which the air around the color motor 21a (see FIG. 6) for rotationally moving the color wheel 21 of the illumination unit 20 can be sucked. Thus, it is possible to cool the color motor 21a by the airflow generated by suction of the light source blower 95.

Figure 17:
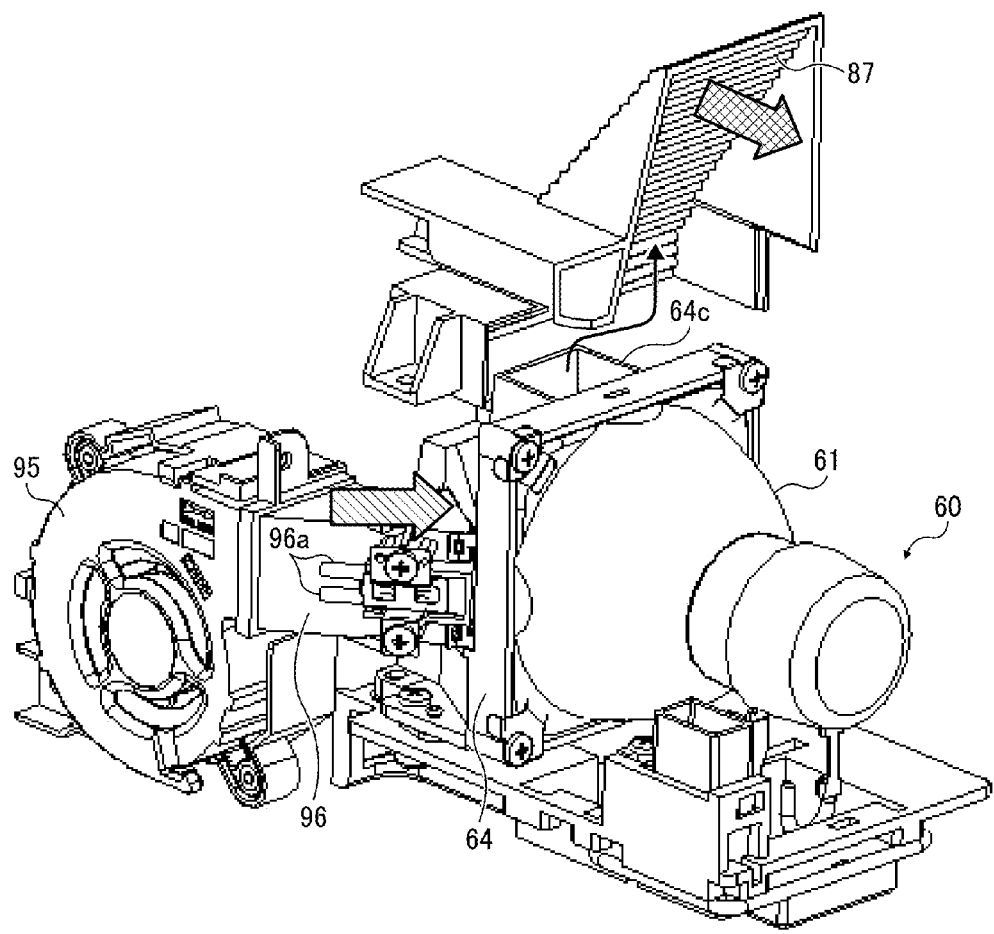
FIG. 17 is a perspective view illustrating a light source blower, a light source duct, a light source unit, and a fluid guide according to an embodiment of the present invention.

As illustrated in FIG. 17, air sucked by the light source blower 95 flows in the light source air supply port 64b (see FIG. 5) of the holder 64 through the light source duct 96. Furthermore, a part of the air flowing in the light source duct 96 flows between the light source housing 97 and the exterior cover 59 from the opening 96a formed on the surface of the light source duct 96 opposite to the exterior cover 59 (see FIG. 13).

The air flowing between the light source housing 97 and the exterior cover 59 from the opening 96a of the light source duct 96 cools the light source housing 97 and the exterior cover 59, and then is discharged from the exhaust duct 85 by the exhaust fan 86.

Furthermore, after the air flowing into the light source air supply port 64b flows into the light source 61 to cool the light source 61, the air is exhausted from the light source exhaust duct 64c provided on the upper surface of the holder 64. The air exhausted from the light source exhaust duct 64c is exhausted to the space surrounded by the power supply device 80 from the opening of the upper surface of the light source housing 97 through the fluid guide 87. Thereafter, after the air is mixed with a low-temperature air going around the second projection optical system 40 and flowing into an enclosed space of the power supply device 80, the mixed air is discharged from the exhaust duct 85 by the exhaust fan 86. In this way, since the high-temperature air exhausted from the light source exhaust duct 64c is mixed with the air outside the apparatus taken from the second intake duct 84 and then is exhausted, it is possible to suppress the air exhausted from the exhaust duct 85 from becoming a high temperature.

Still referring to FIG. 17, the fluid guide 87 is formed in step-wise shape. With this configuration, the light from the light source is not reflected in the direction toward the exhaust fan 86.

In addition, it is preferred that the operation unit 83 operated by a user be provided on the upper surface of the apparatus so as to be easily operated by the user. However, in this embodiment, since the dust-proof glass 51 for projecting the image onto the projection plane 2 is provided on the upper surface of the projector 1, the operation unit 83 is provided at a position that overlaps the light source 61 when the projector is viewed from the Y-direction.

In this embodiment, since the air becoming the high temperature by cooling the light source 61 is exhausted toward the exhaust duct 85, by the airflow flowing toward the exhaust duct 85 from the second intake duct 84 between the light source unit 60 and the operation unit 83, it is possible to suppress the high-temperature air from moving to the operation unit 83. Thus, it is possible to suppress the temperature of the operation unit 83 from rising, by the air becoming a high temperature by cooling the light source 61. Furthermore, a part of the air going around the second projection optical system 40 from the second intake duct 84 and flowing toward the exhaust duct 85 passes through the right under the operation unit 83 to cool the operation unit 83. This can also suppress an increase in temperature of the operation unit 83.

Furthermore, the air outside the apparatus is sucked from the power source intake duct 56 provided on the base member 53 illustrated in FIG. 13 by the suction of the exhaust fan 86. On the back side in the X-direction in the drawings from the light source housing 97, a ballast substrate (not illustrated) for supplying stable power (current) to the light source 61 is disposed. The air outside the apparatus absorbed from the power source intake duct 56 cools the ballast substrate, while moving upward between the light source housing 97 and the ballast substrate (not illustrated). Thereafter, after the air flows into the space surrounded by the power supply device 80 disposed above the ballast substrate, the air is exhausted from the exhaust duct 85 by the exhaust fan 86.

Furthermore, on a left lower side of FIG. 16 of the apparatus main body, a cooling unit 120 that cools the heat sink 13 of the light modulator 10, the light source bracket 62 of the light source unit 60 or the like is disposed. The cooling unit 120 has an intake blower 91, and a horizontal duct 93. Furthermore, at a position of the base member 53 facing the intake blower 91, the first intake duct 92 is provided. With this configuration, there is provided a state in which the intake blower 91 is disposed in the first intake duct 92.

Figure 18:
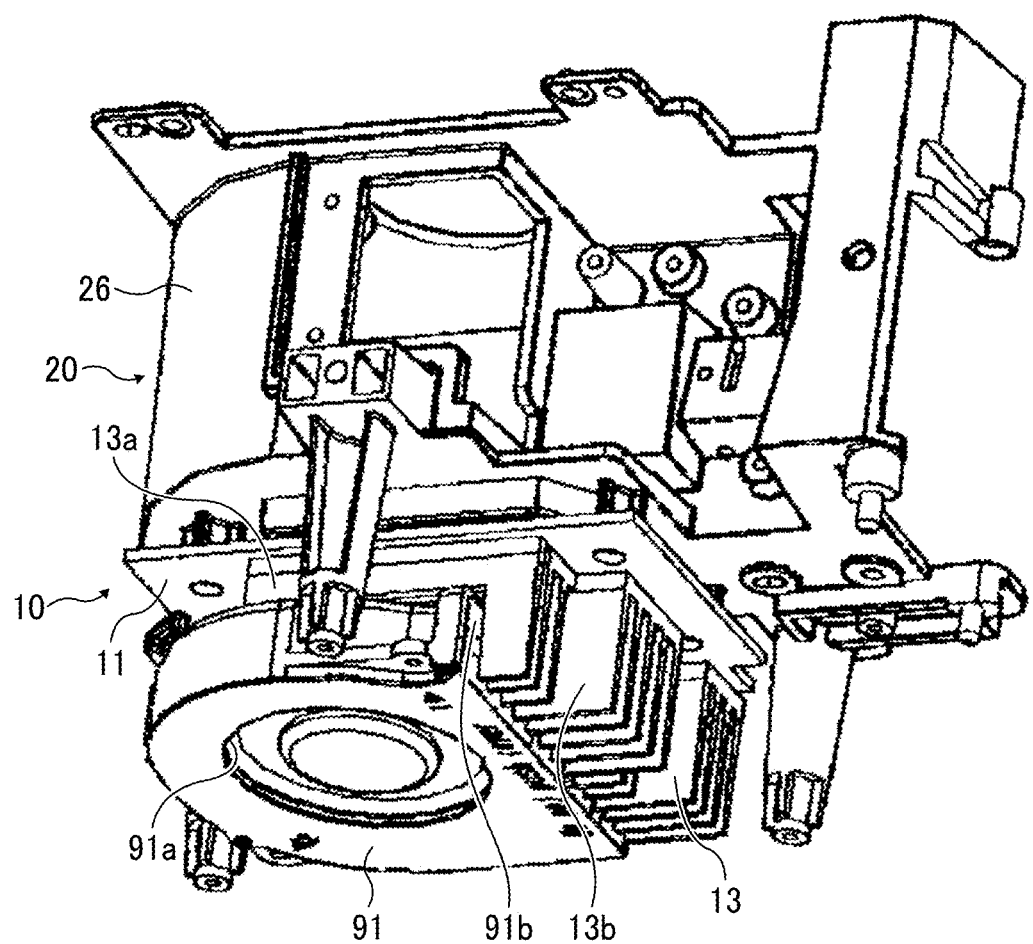
FIG. 18 is a perspective view illustrating the light modulator, the illumination unit, and an intake blower according to an embodiment of the present invention.

As illustrated in FIG. 18, the intake blower 91 is a double-sided intake sirocco fan. The intake blower 91 is attached to the light modulator 10 such that the base member side blower intake duct 91a of the intake blower 91 faces the first intake duct 92 provided in the base member 53 as an opposite surface facing the DMD 12 of the housing of the projector. In addition, the opposite surface of the base member side blower intake duct 91a of the intake blower 91 is also an intake duct, but a quantity of intake of the base member side blower intake duct 91a is high. The heat sink 13 is formed by a first fin 13a having a predetermined fin height, and a second fin 13b having a fin height higher than that of the first fin 13a. The intake blower 91 is attached to the first fin 13a such that the blower exhaust duct 91b of the intake blower 91 faces the second fin 13b of the heat sink 13. By using the intake blower 91 as a double-sided intake sirocco fan, the first fin 13a of the heat sink 13 can be efficiently cooled.

As illustrated in FIG. 16, in the horizontal duct 93, the upper surface and lower surface are partially opened, and the horizontal duct 93 is fixed to the base member 53 of the projector 1 such that the opening of the lower surface faces the first intake duct 92 provided in the base member 53. Furthermore, the light modulator 10 is disposed on the horizontal duct 93 such that the heat sink 13 of the light modulator 10 and the intake blower 91 attached to the light modulator 10 pass through the opening of the upper surface of the horizontal duct.

The intake blower 91 sucks the air outside the apparatus by the base member side blower intake duct 91a via the first intake duct 92, and exhausts the air outside the apparatus sucked by the intake blower 91 toward the second fin 13b of the heat sink 13 from the blower exhaust duct 91b. Thus, the second fin 13b of the heat sink 13 is air-cooled. The DMD 12 can be efficiently cooled by air-cooling of the second fin 13b of the heat sink 13, thereby suppressing the DMD 12 from becoming a high temperature.

As illustrated in FIG. 16, the flow is generated by the intake blower 91, and the air passed through the heat sink 13 moves in the horizontal duct 93 and flows into the passage 65 or the opening 65a provided in the light source bracket 62 of the light source unit 60 illustrated in FIG. 5. The air flowing into the opening 65a flows between the opening and closing cover 54 and the light source bracket 62 to cool the opening and closing cover 54.

The air flowing into the passage 65 cools the light source bracket 62, and then flows into the portion on the opposite side to the emission side of the light source 61 to cool the side opposite to the reflection surface of the reflector of the light source 61, thereby cooling the reflector of the light source 61. Thus, the air passing through the passage 65 absorbs heat of both the light source bracket 62 and the light source 61. The air passed through the vicinity of the reflector passes through the exhaust duct 94 that guides the air from the height of the light source bracket 62 to the height near the bottom of the exhaust fan 86. Thereafter, the air joins the air exhausted from the light source exhaust duct 64C. The mixed air is then discharged from the exhaust duct 85 through the fluid guide 87 by the exhaust fan 86. The air flowing into between the opening and closing cover 54 and the light source bracket 62 through the opening 65a cools the opening and closing cover 54, moves in the apparatus, and is discharged from the exhaust duct 85 by the exhaust fan 86. Accordingly, the flow path of air from the first intake duct 92 to the exhaust duct 85 is away from spaces between the lower surface of the curved mirror 42 and the lens holder 32.

Before explaining the flow of air in the image projection apparatus 1 of the present embodiment, the flow of air in the background image projection apparatus is described as a comparative example.

Figure 20:
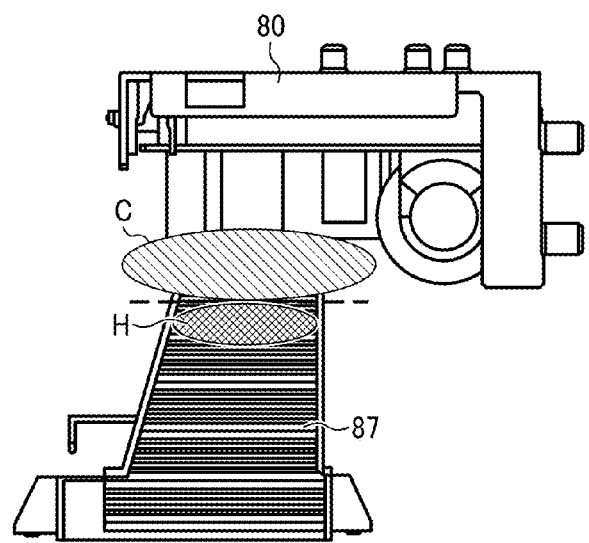
FIG. 20 is a diagram as seen from a direction of an arrow a of FIG. 21.
Figure 25:
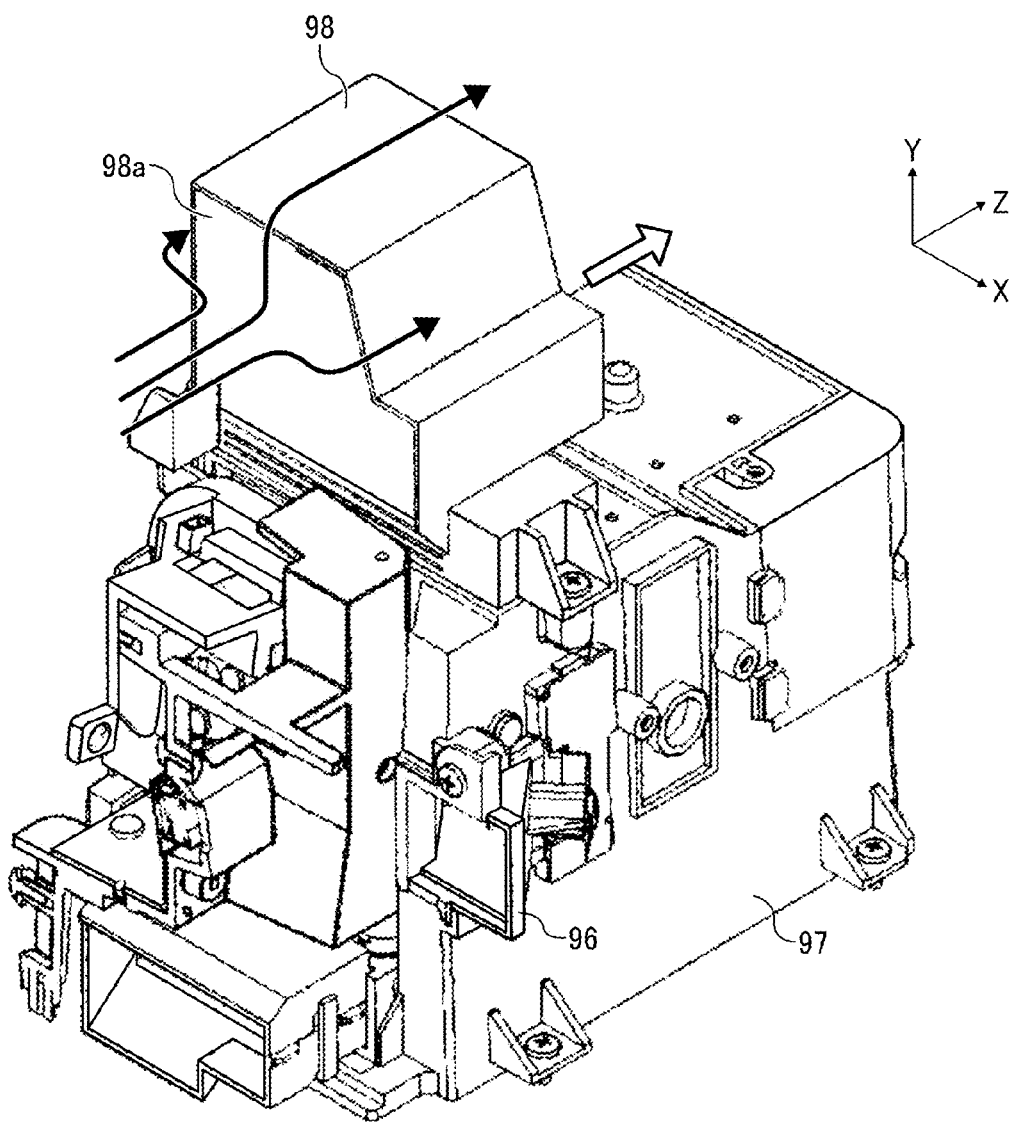
FIG. 25 is a perspective view illustrating the flow of air above a light source housing of an image projection apparatus of the related art.

FIG. 25 is a perspective view illustrating the flow of air above a light source housing of the background image projection apparatus described in JP-2013-109042 A, and FIG. 20 is a cross-sectional view thereof.

The background image projection apparatus is provided with an intake duct that takes air from the outside into an apparatus main body, an exhaust duct 85 that discharges the air from the apparatus main body, and an exhaust fan 86 that generates the flow of air from the intake duct toward the exhaust duct 85.

Figure 26:
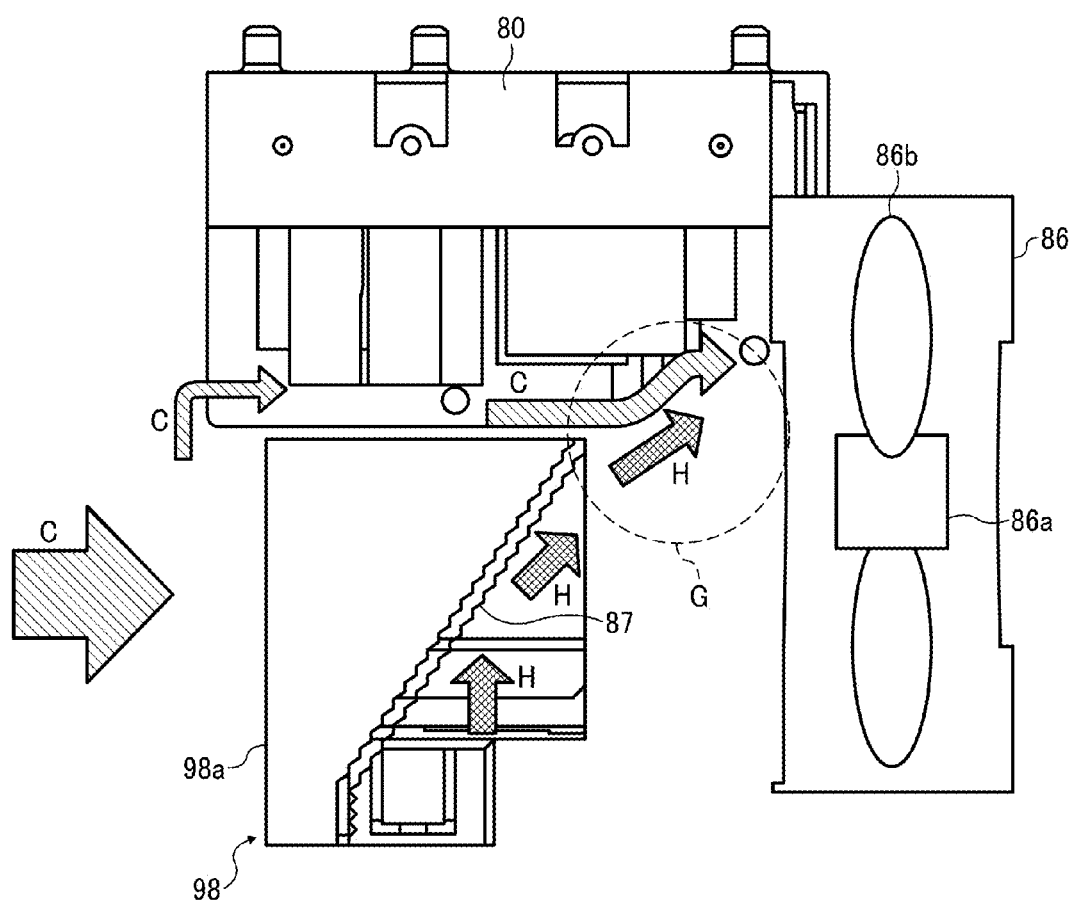
FIG. 26 is a cross-sectional view illustrating the flow of air above the light source housing of the image projection apparatus of the related art.

As illustrated FIGS. 25 and 26, a cooling air C taken from the intake duct hits against a wall 98a of a duct 98 provided with a fluid guide 87, is dispersed in all directions, and flows toward the exhaust fan 86. As illustrated in FIG. 25, the cooling air C flowing onto the upper surface of the duct 98 cools the power supply device 80, and then joins air H subsequent to cooling the light source that is raised along the fluid guide 87 in front of the exhaust fan 86, in particular, at the merging area G indicated by a chain line in FIG. 25. Moreover, the air is exhausted from the exhaust duct 85 by the exhaust fan 86. In this example, the light source unit 60 in which the temperature of the valve reaches near 1000° C. has a high rated temperature, compared to that of the power supply device 80 in which elements having the rated temperature of 105° C. or less are aligned. Accordingly, the cooling air C, even after cooling the power supply device 80, has a sufficiently low temperature than that of the air H subsequent to cooling the light source.

Furthermore, since the cooling air C flows through the narrow space enclosed by the upper surface of the duct 98 and the power supply device 80, the cooling air C increases in the flow velocity while flowing into the merging area G. This is clear from the fact that the flow rate of fluid passing through a certain cross-section is calculated by the product of the flow velocity and the cross-sectional area. Bernoulli's theorem shows that the more the flow velocity is, the lower the pressure is. Therefore, by allowing the cooling air to flow through the narrow flow path between the upper surface of the duct 98 and the power supply device 80, the flow velocity of the cooling air increases at the moment of passing through the flow path, and as a result, the pressure drop occurs from the Bernoulli's theorem.

Meanwhile, since the apparatus has a configuration in which the flow path gradually widens in the process of flowing along the fluid guide 87, the air H subsequent to cooling the light source flows into the merging area G while the flow velocity thereof decreases. As a result, a flow velocity difference occurs between the cooling air C and the air H subsequent to cooling the light source at the merging area G. As a result of the occurrence of difference in the flow velocity, the air H subsequent to cooling the light source having the small flow velocity is naturally drawn to the cooling air C having the large flow velocity with a lower pressure than the air H subsequent to cooling the light source. Thus, the air H subsequent to cooling the light source flows toward the exhaust fan 86 along the flow of the cooling air C. As a result, the cooling air C and the air H subsequent to cooling the light source are not sufficiently mixed with each other, become two air layers of a cooling air layer and an air layer subsequent to cooling the light source, and flow toward the exhaust fan 86.

As illustrated in FIG. 25, in the background image projection apparatus, the leading end of the exhaust fan 86 side of the fluid guide 87 is located above the center of rotation of the exhaust fan 86. Therefore, the cooling air C having the high flow velocity joins the air subsequent to cooling the light source at a position above the rotary shaft 86*a* of the exhaust fan 86. Furthermore, since the cooling air C hits against the wall 98*a* of the duct 98 and disperses in all directions, the flow rate of the cooling air C flowing between the upper surface of the duct 98 and the space surrounded by the power supply device 80 decreases. As a result, the cooling air C flows to the exhaust fan 86 so as to be lifted up by ascending airflow of the air H subsequent to cooling the light source. As a result, the two air layers of the cooling air layer and the air layer subsequent to cooling the light source flow upward from the rotary shaft 86*a* of the exhaust fan 86. Moreover, the air of the two layers of the cooling air layer and the air layer subsequent to cooling the light source is cut by a blade 86*b* of the exhaust fan 86, and then is exhausted to the outside of the apparatus so as to be pushed into the exhaust duct 85. The blade 86*b* of the exhaust fan 86 has a main function of cutting and pushing the air, and thus, the two air layers of the cooling air layer and the air layer subsequent to cooling the light source are hardly stirred by the blade 86*b*. Thus, in the background image projection apparatus, the cooling air layer and the air layer subsequent to cooling the light source are not sufficiently mixed with each other, and two air layers of the cooling air layer and the air layer subsequent to cooling the light source are caused and exhausted to the outside of the apparatus. As a result, there has been a temperature distribution in which some of the air exhausted from the exhaust duct is at a relatively high temperature, and the other thereof is at a relatively low temperature.

The above-described technique of mixing the cooling air with the air subsequent to cooling the light source, before exhausting, is applied due to the fact that it is not possible to reduce thermal energy itself held by the air subsequent to cooling the light source to be exhausted. Thermal energy is generated by conversion of optical energy emitted from the light source, and there is a possibility that a decrease in thermal energy itself leads to a decrease in optical energy. Since the decrease in the optical energy may lower an amount of light of the projector, the value of the product is lowered. Therefore, when lowering the temperature of the exhausted air, the magnitude of thermal energy itself does not change, and only the temperature needs to be lowered. As the most effective unit that lowers only the exhaust temperature without changing the magnitude of thermal energy itself of the light source, there is a method of mixing the low-temperature air in the apparatus with the high-temperature air subsequent to cooling the light source to obtain a uniform temperature of the exhaust air. This can reduce the temperature of the exhaust gas without lowering the thermal energy, and does not affect the specification of the product itself, such as brightness. However, in the conventional configuration, the low-temperature air and the high-temperature air had not been mixed with each other well, resulting in non-uniformity such that the exhaust air may have contained the hot spots.

In view of the above, one aspect of an example embodiment of the present invention is to provide an image projection apparatus that can obtain a uniform temperature distribution of air to be discharged from the outside of the apparatus.

More specifically, in the following embodiment, the two air layers of the cooling air layer and the air layer subsequent to cooling the light source are caused to collide with the rotary shaft 86*a* of the exhaust fan 86, and are exhausted by stirring the air layers by the rotary shaft 86*a* of the exhaust fan.

Figure 19:
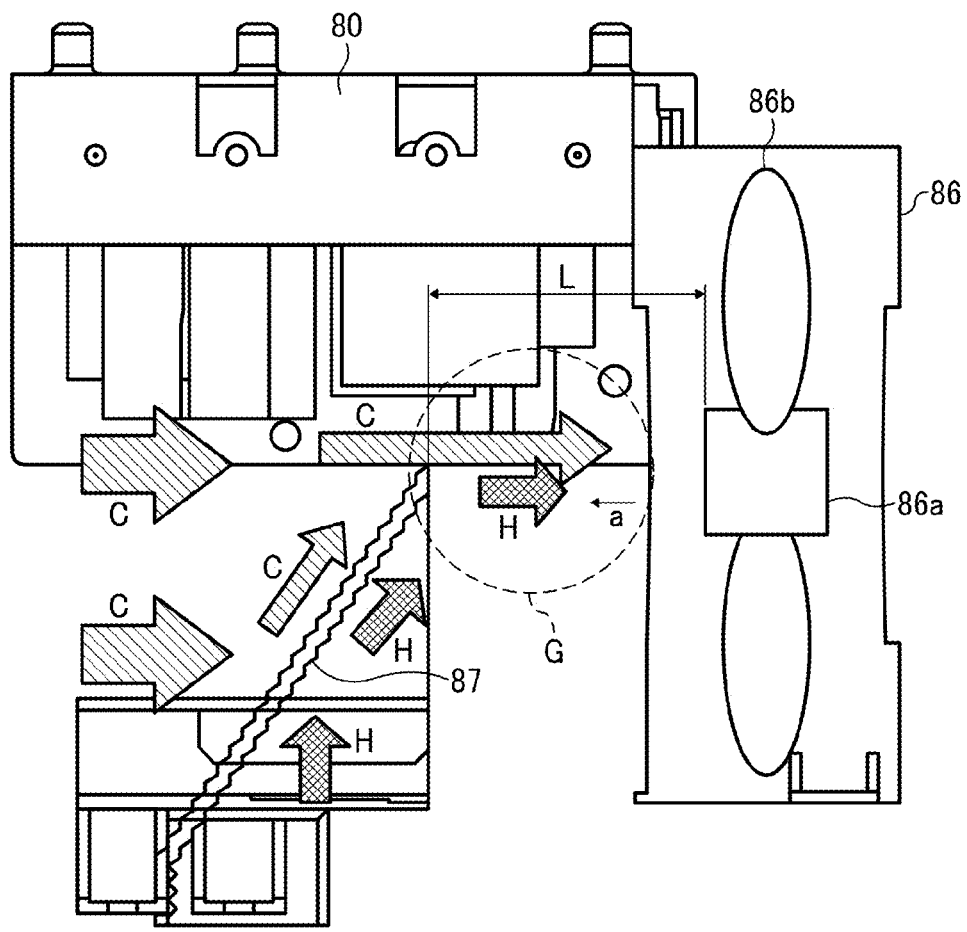
FIG. 19 is a cross-sectional view illustrating the flow of air above the light source housing according to an embodiment of the present invention.

FIG. 19 is a cross-sectional view illustrating the flow of air above the light source housing 97 of this embodiment, and FIG. 20 is a view as viewed from a direction of an arrow "a" in FIG. 19.

As illustrated in FIG. 19, in this embodiment, the apparatus is configured so that the leading end of the exhaust fan 86 side of the fluid guide 87 is provided at a position facing the center of rotation of the exhaust fan 86, and the cooling air C is directed to the rotary shaft 86*a* of the exhaust fan 86. Furthermore, in this embodiment, the apparatus is configured so that the duct 98 (See FIG. 26) is not provided and only the fluid guide 87 is provided. The cooling air C is guided by the surface of the fluid guide 87 that is opposite to the surface that guides the air H subsequent to cooling the light source. That is, in this embodiment, the apparatus is configured so that the flow path of the cooling air becomes gradually narrow toward the merging area G.

In this example, the rotary shaft 86*a* not only includes a rotary axis defined by the center of rotation of the exhaust fan 96, but also includes surroundings of the rotary axis such as any portion having the rotary axis therein, for example, a surface having the rotary axis in its center.

With such a configuration, the cooling air C (air outside the apparatus) drawn from the second intake duct 84 and going around the second projection optical system 40 hits against the surface of the fluid guide 87 on the opposite side to the guide surface of the air H subsequent to cooling the light source. As illustrated in FIG. 19, the fluid guide 87 has a sloped face that is sloped, such that the upper end portion thereof is located near the position where the exhaust fan 86 is disposed. The cooling air C that hits against the fluid guide 87 is guided by the fluid guide 87 and moves upward. Since the flow path becomes gradually narrow toward the merging area G, the flow velocity of the cooling air moving to the merging area G while being guided by the fluid guide 87 becomes gradually higher. In this embodiment, the cross-sectional area of the space surrounded by the leading end of the fluid guide 87 and the power supply device 80 is substantially the same as the configuration illustrated in FIG. 26. Thus, the flow velocity of the cooling air C flowing to the merging area G becomes the flow velocity that is substantially the same as the configuration illustrated in FIG. 26.

In this embodiment, since the leading end of the exhaust fan 86 side of the fluid guide 87 is provided at a position facing the center of rotation of the exhaust fan 86, the cooling air flows into the merging area G, directing toward the rotary shaft 86*a* of the exhaust fan 86. As described above, the cooling air C flows into the merging area G while accelerating the flow velocity.

In this embodiment, since the apparatus has a configuration in which the flow path of the cooling air C becomes gradually narrow toward the merging area G, compared to the configuration in which the flow path becomes rapidly narrow as illustrated in FIG. 26, the flow rate of the cooling air C that flows to the merging area G increases. Therefore, the air in the two layers of the cooling air C and the air H subsequent to cooling the light source joined at the merging area G flows toward the rotary shaft 86a of the exhaust fan 86, without being raised by the ascending airflow of the air H subsequent to cooling the light source. Moreover, the air in the two layers of the cooling air C and the air H subsequent to cooling the light source collides with the rotary shaft 86a of the exhaust fan 86.

As the air in the two layers of the cooling air C and the air H subsequent to cooling the light source collides with the rotary shaft 86a of the exhaust fan 86, the air is disturbed, and with rotation of the rotary shaft 86a, the air is instantaneously stirred. After being mixed in front of the exhaust fan 86, the air in the two layers of the cooling air C and the air H subsequent to cooling the light source is exhausted to the outside of the apparatus by the exhaust fan 86. Further, in this example, the air in the two layers of the cooling air C and the air H subsequent to cooling the light source has a certain length in a direction perpendicular to the sheet surface of FIG. 19, such that the air of the two layers has a portion that does not collide with the rotary shaft 86a of the exhaust fan 86. However, by the turbulence of the air colliding with the rotary shaft 86a and the stirring action of the rotary shaft 86a, the air that does not collide with the rotary shaft 86a is also disturbed in front of the exhaust fan 86. As a result, in the air that does not collide with the rotary shaft 86a, the cooling air C and the air H subsequent to cooling the light source are mixed in front of the exhaust fan 86. This suppresses the air from being exhausted to the outside of the apparatus in the state of two layers of the cooling air layer and the air layer subsequent to cooling the light source, and further suppresses the high-temperature hot spots from locally occurring in the exhaust wind. This improves uniformity in temperature in the exhaust wind while suppressing an occurrence of a high temperature location in a part of the grid-like exhaust duct 85.

As described above, in this embodiment, by allowing the air in two layers of the cooling air C and the air H subsequent to cooling the light source to collide with the rotary shaft 86a of the exhaust fan 86, thereby stirring the air by the rotation of the rotary shaft 86a, the cooling air C is actively mixed with the air H subsequent to cooling the light source.

Furthermore, in this embodiment, the cooling air C and the air H subsequent to cooling the light source are mixed with each other by the rotary shaft 86a of the exhaust fan 86. Accordingly, there is no need to provide a new stirring mechanism, and there is no need to provide a mixing region in the housing. Thus, there is merit even in a design of a compact projector.

Furthermore, in this embodiment, a distance L (FIG. 19) from the rotary shaft 86a of the exhaust fan 86 to the leading end of the fluid guide 87 is set to about 30 mm. When the distance L is too short, the air H subsequent to cooling the light source is not sufficiently attracted to the cooling air C, such that the air H subsequent to cooling the light source is exhausted from below the rotary shaft 86a. As a result, the exhaust wind of the lower side of the rotary shaft 86a becomes a high temperature. Meanwhile, when the distance L is too long, there is a high risk that the cooling air C is not directed toward the rotary shaft 86a. By setting the distance L from the rotary shaft 86a of the exhaust fan 86 to the leading end of the fluid guide 87 to about 30 mm, it can satisfactorily attract the air H subsequent to cooling the light source to the cooling air C, while allowing the air in the two layers of the layer of the air H subsequent to cooling the light source and the layer of the cooling air C to reliably hit against the rotary shaft 86a.

In this example, the exhaust fan 86 has the rotary shaft 86a of about 37 mm in diameter, two blades 86b each of about 72 mm in diameter, and airflow rate is about 0.825 cubic meters/min. The airflow rate for the light source blower 95 is about 0.1 cubic meters/min. The airflow rate for the intake blower 91 is about 0.147 cubic meters/min. Next, modified examples of the present embodiment will be described.

First Modified Example

Figure 21:
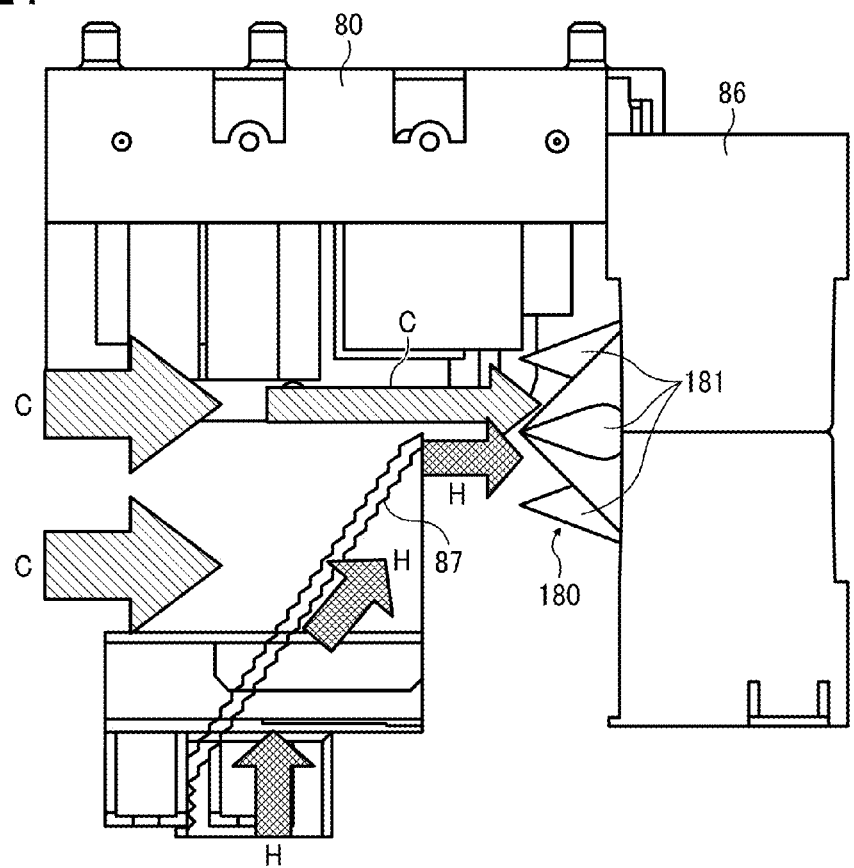
FIG. 21 is a cross-sectional view illustrating the flow of air above the light source housing according to a first modified example of the present invention.
Figure 22:
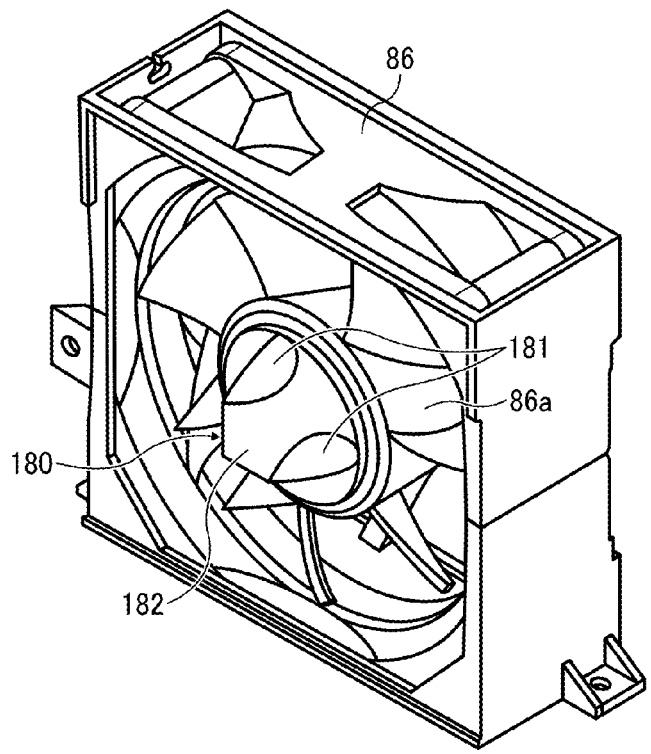
FIG. 22 is a perspective view illustrating an exhaust fan according to the first modified example of the present invention.

FIG. 21 is a cross-sectional view illustrating the flow of air above a light source housing 97 of a first modified example, and FIG. 22 is a perspective view illustrating an exhaust fan 86 of the first modified example.

As illustrated FIGS. 21 and 22, in the first modified example, a stirring member 180 is provided on the rotary shaft 86a of the exhaust fan 86. As illustrated in FIG. 22, the stirring member 180 has a configuration in which blades 181 are provided around a hemispherical projection 182 in a rotational direction at equal intervals.

In the first modified example, as illustrated in FIG. 25, the air in two layers of the cooling air C and the air H subsequent to cooling the light source flowing toward the rotary shaft 86a is stirred by the stirring member 180. With this configuration, the cooling air C is actively mixed with the air H subsequent to cooling the light source. Accordingly, the air, or the exhaust wind, to be exhausted from the exhaust duct 85 has uniform temperature, while suppressing the occurrence of the locally hot spots.

Furthermore, the stirring member 180 is provided with the hemispherical projection 182. Thus, the air in two layers of the cooling air C and the air H subsequent to cooling the light source is diffused by the projection 182. This suppresses the high-temperature air H subsequent to cooling the light source from being exhausted to the outside of the apparatus from one location of the exhaust duct 85 by being diffused, and the occurrence of the locally hot spots can be further suppressed.

Figure 23:
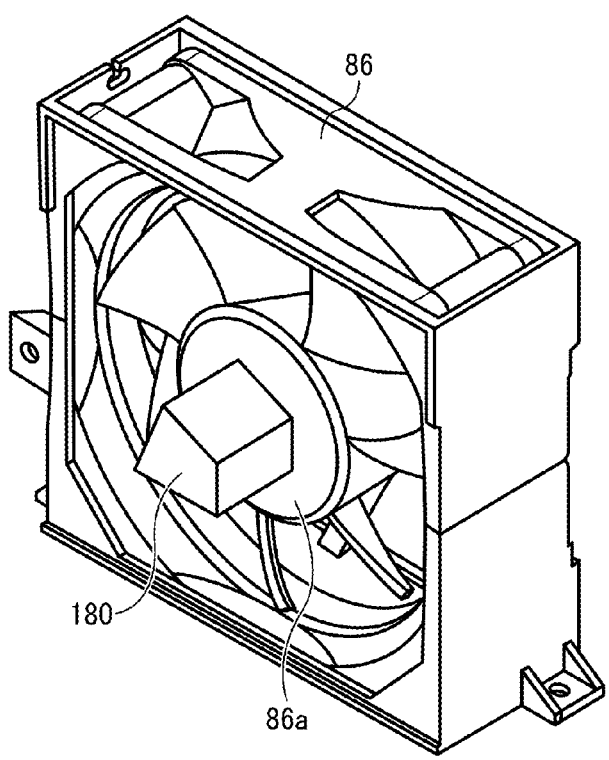
FIG. 23 is a perspective view illustrating an aspect in which a stirring member is formed in a prismatic shape according to an embodiment of the present invention.

Furthermore, the stirring member 180 may have a prismatic shape, as illustrated in FIG. 23. In such a prismatic member, only by attaching the prismatic stirring member 180 to the rotary shaft 86a of the exhaust fan, a stirring effect of the air in two layers of the cooling air C and the air H subsequent to cooling the light source due to the stirring member 180 can be confirmed.

Figure 24B:
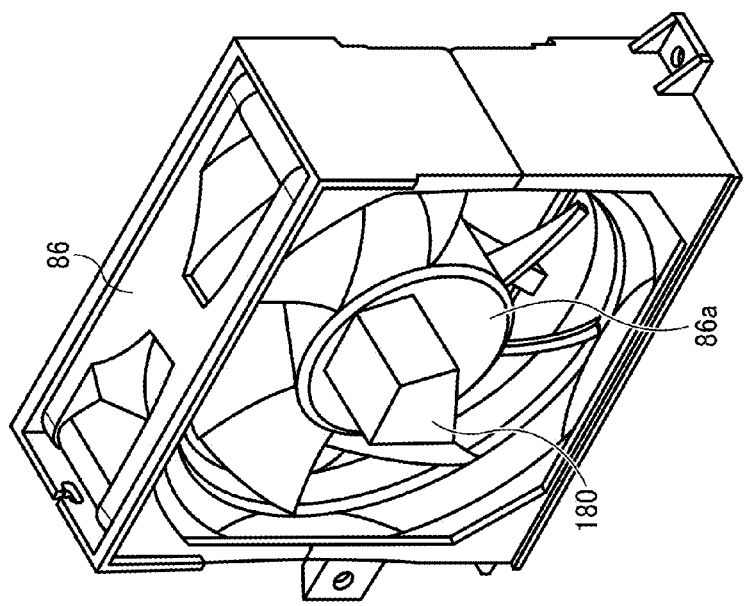
FIGS. 24A and 24B are diagrams illustrating an aspect in which the stirring member is provided at a position deviated from the center of rotary shaft of the exhaust fan according to an embodiment of the present invention.
Figure 24A:
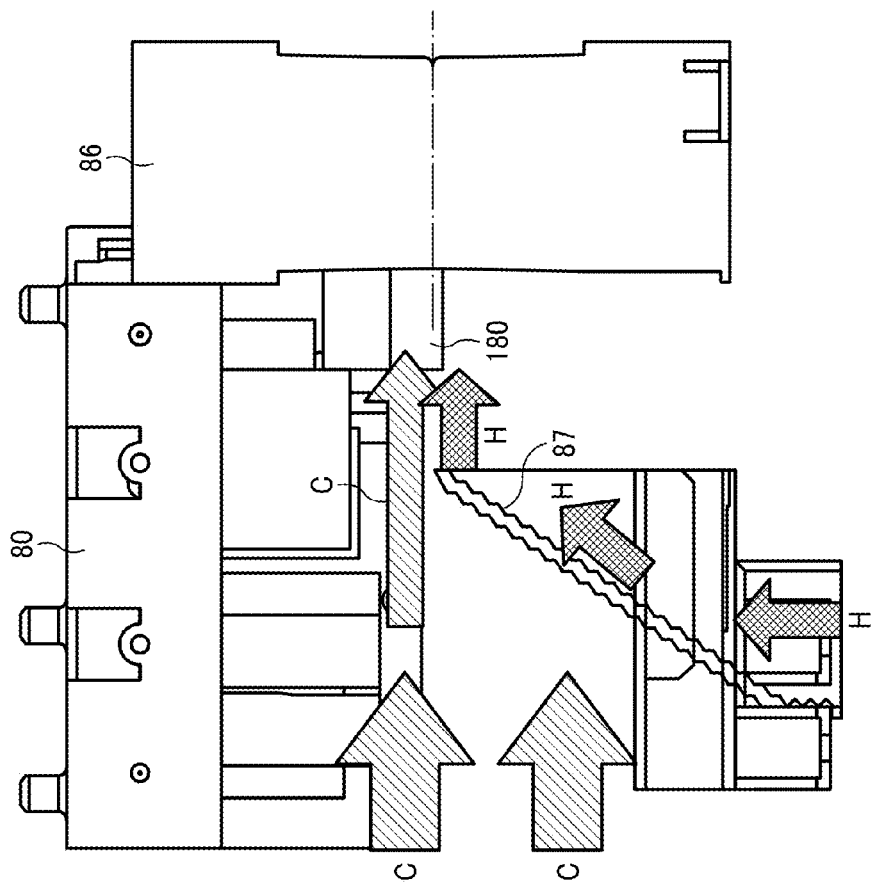

Furthermore, as illustrated FIGS. 24A and 24B, the prismatic stirring member 180 may be provided at a position that is deviated from the center of rotation of the exhaust fan 86. Thus, by providing the stirring member 180 at a position deviated from the center of rotation of the exhaust fan 86, the stirring effect can be enhanced.

In another example, the flow velocity of the air H subsequent to cooling the light source may be set to be higher than the flow velocity of the cooling air C, and the air H subsequent to cooling the light source may flow toward the rotary shaft 86a of the exhaust fan 86. In the case of such a configuration, the cooling air C is attracted to the air H subsequent to cooling the light source and flows to the rotary shaft 86a along the air H subsequent to cooling the light source, thus allowing the air in two layers of the cooling air C and the air H subsequent to cooling the light source to flow through the rotary shaft 86a of the exhaust fan 86.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

According to one aspect, in the image projection apparatus such as the projector 1 that is provided with a light source 61, the air H subsequent to cooling the light source heated by the light source 61, joins the cooling air C having a lower temperature than that of the air H, at the merging area G, before being exhausted to the outside of the apparatus.

The air flows to the merging area G such that the flow velocity difference occurs between the air H and the air C at the merging area G, and the air having the higher flow velocity flows to the rotary shaft of the exhaust fan 86.

As is evident from Bernoulli's theorem that is a conservation side of pressure and flow velocity, the air having the higher flow velocity flows through the merging area at a lower pressure than the air having the low flow velocity. As a result, the air having the low flow velocity is attracted to the air having the high flow velocity and flows along the air having the high flow velocity. Furthermore, since the apparatus is configured so that the air having the high flow velocity flows toward the rotary shaft of the exhaust fan, the air having the high flow velocity and the air having the low flow velocity moving along the flow collide with the rotary shaft of the exhaust fan. That is, the air H heated by the light source and the air C having the lower temperature than the air H collide with the rotary shaft of the exhaust fan. By collision of the heated air and the cooling air with the rotary shaft, the air is disturbed, and the air that collides by the rotation of the rotary shaft is stirred. Accordingly, the heated air can be satisfactorily mixed with the cooling air in front of the exhaust fan, and the mixed air can be exhausted to the outside of the apparatus by the exhaust fan. This helps to obtain a uniform temperature distribution of the air exhausted to the outside of the apparatus, thus suppressing the high-temperature air from being partially exhausted from the exhaust duct.

In one example, the apparatus is configured so that the flow path configured to allow the air having the high flow velocity to flow to the merging area G becomes gradually narrow toward the merging area G.

According to one aspect, the flow velocity can be increased by gradually narrowing the flow path as described in the embodiment. This can further suppress a decrease in flow rate flowing into the merging area G.

In one example, the apparatus is provided with a guide, such as the fluid guide 87 that gradually narrows the flow path, which allows the air having the high flow velocity to flow to the merging area. The flow path further has the downstream end in the flow direction of air of the guide, which faces the rotary shaft 86a of the exhaust fan 86.

With this configuration, the air having the high flow velocity flows to the rotary shaft 86a.

Furthermore, according to some examples, the apparatus is equipped with a stirring unit such as the stirring member 180 that stirs the air flowing to the rotary shaft 86a.

For example, as described in the first modified example, it is possible to actively stir the air including the layer of the cooling air C flowing to the rotary shaft 86a and the layer of the air subsequent to cooling the light source, by the stirring member 180. With this configuration, the air is actively mixed to obtain a further uniform temperature distribution of the air exhausted from the exhaust duct.

In one example, the stirring unit such as the stirring member 180 is provided on the rotary shaft 86a.

According to one example, by providing the stirring member 180 on the rotary shaft 86a, the stirring member 180 is rotated with rotation of the exhaust fan 86, thus eliminating a drive source for rotationally driving the stirring member 180. This can suppress an increase in the number of components, thus suppressing an increase in the cost of the apparatus.

In one example, the stirring unit such as the stiffing member 180 is provided at the center of the rotary shaft of the exhaust fan 86. With this configuration, the wear of the shaft due to the axial vibration of the exhaust fan 86 can be suppressed, as well as suppressing shortening of the life of the exhaust fan 86.

In one example, the stirring unit such as the stirring member 180 is a projection that is attached to the position located at a distance away from the center of the rotary shaft of the exhaust fan 86. This improves the stirring efficiency, as compared to the case of providing the projection at the center of the rotary axis of the exhaust fan 86.

What is claimed is:

1. An image projection apparatus, comprising:
   a light source configured to irradiate light to project a projection image;
   an exhaust fan having a rotary shaft provided with at least one blade, the rotary shaft being rotated to exhaust air inside the apparatus to the outside of the apparatus;
   a guide having a sloped face that is sloped toward the exhaust fan, the sloped face having a first side surface facing the light source and a second side surface that is a back surface of the first side surface;
   a first flow path, defined by the first side surface of the guide, to guide air heated by the light source toward the rotary shaft of the exhaust fan; and
   a second flow path, defined by the second side surface of the guide, to guide air having temperature lower than temperature of the air heated by the light source, toward the rotary shaft of the exhaust fan, wherein the second flow path is made narrower at an exhaust section from which the air is exhausted than at an intake section from which the air is taken.

2. The image projection apparatus of claim 1, wherein the sloped face of the guide is made so as to gradually narrow the second flow path to increase the flow velocity of the air guided by the second flow path.

3. The image projection apparatus of claim 1, wherein the flow velocity of the air guided by the second flow path is higher than the flow velocity of the air guided by the first flow path, at an end portion of the guide facing the exhaust fan.

4. The image projection apparatus of claim 1, wherein the guide has an end portion facing the exhaust fan, which is provided at a height substantially the same as a height of the rotary shaft of the exhaust fan.

5. The image projection apparatus of claim 1, wherein the guide has an end portion facing the exhaust fan, which is provided at a location facing the rotary shaft of the exhaust fan.

6. The image projection apparatus of claim 1, wherein the sloped face has a step-wise structure.

7. The image projection apparatus of claim 1, wherein the guide has an end portion facing the exhaust fan, which forms a space with the exhaust fan.

8. The image projection apparatus of claim 7, wherein the guide has an end portion facing the exhaust fan, which is located at a distance away from the exhaust fan, so as to sufficiently attract the air guided by the second flow path to the air guided by the first flow path.

9. The image projection apparatus of claim 1, further comprising:
   a power supply unit,
   wherein the air guided by the second flow path cools the power supply unit as the air passes along the power supply unit.

10. The image projection apparatus of claim 1, further comprising:
    a first intake duct to take the outside air into the first flow path; and a second intake duct to take the outside air into the second flow path.

11. The image projection apparatus of claim 10, wherein the second intake duct is provided at a location facing the exhaust fan.

12. The image projection apparatus of claim 11, wherein the first intake duct is provided at a surface of the apparatus that is different than a surface of the apparatus where the second intake duct is provided.

13. The image projection apparatus of claim 12, wherein the first intake duct is provided at a location having a distance to the light source that is shorter than a distance to the second intake duct.

14. The image projection apparatus of claim 1, further comprising:
an image forming element to form the projection image, wherein the air guided by the first flow path includes air used for cooling the image forming element.

15. The image projection apparatus of claim 1, further comprising:
a stirring unit that stirs the air guided by the guide.

16. The image projection apparatus of claim 15, wherein the stirring unit is provided at the rotary shaft of the exhaust fan.

17. The image projection apparatus of claim 16, wherein the stirring unit is provided on a rotary axis of the exhaust fan.

18. The image projection apparatus of claim 17, wherein the stirring unit is provided at a distance away from the rotary shaft of the exhaust fan.

19. The image projection apparatus of claim 1, wherein the guide guides the air heated at the light source such that the air heated at the light source flows toward the rotary shaft while ascending as ascending airflow.

20. The image projection apparatus of claim 19, wherein the air having lower temperature flows toward the rotary shaft without being raised by the ascending airflow of the air heated at the light source.

21. An image projection apparatus, comprising:
a light source configured to irradiate light to project a projection image;
a holder configured to support the light source, the holder having an exhaust duct for exhausting air heated by the light source;
an exhaust fan having a rotary shaft provided with at least one blade, the rotary shaft being rotated to exhaust air inside the image projection apparatus to the outside of the image projection apparatus; and
a guide configured to guide air exhausted from the exhaust duct and air that is not exhausted from the exhaust duct toward the rotary shaft of the exhaust fan, the guide having a sloped face that is sloped upward to the exhaust fan so that the air exhausted from the exhaust duct is guided by the guide while ascending as ascending airflow, the sloped face having a first side surface facing the light source and a second side surface that is a back surface of the first side surface, the first side surface defining a first flow path to guide air heated by the light source toward the rotary shaft of the exhaust fan, the second side surface defining a second flow path to guide air having temperature lower than temperature of the air heated by the light source toward the rotary shaft of the exhaust fan, wherein the second flow path is made narrower at an exhaust section from which the air is exhausted than at an intake section from which the air is taken.

22. The image projection apparatus of claim 20, wherein the air that is not exhausted from the exhaust duct flows toward the rotary shaft without being raised by the ascending airflow of the air heated at the light source.

* * * * *